(12) United States Patent
Kumazaki et al.

(10) Patent No.: US 8,296,002 B2
(45) Date of Patent: Oct. 23, 2012

(54) VEHICLE CONTROL APPARATUS

(75) Inventors: Kenta Kumazaki, Toyota (JP); Tooru Matsubara, Toyota (JP); Atsushi Tabata, Okazaki (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 13/142,741

(22) PCT Filed: Aug. 31, 2010

(86) PCT No.: PCT/JP2010/064818
§ 371 (c)(1),
(2), (4) Date: Jun. 29, 2011

(87) PCT Pub. No.: WO2012/029126
PCT Pub. Date: Mar. 8, 2012

(65) Prior Publication Data
US 2012/0053769 A1 Mar. 1, 2012

(51) Int. Cl.
*B60L 9/00* (2006.01)
(52) U.S. Cl. ............... 701/22; 701/51; 701/54; 701/56; 701/59; 477/2; 477/3; 477/5; 477/15; 477/109; 477/115; 477/140; 903/945; 903/947; 180/338; 180/65.275; 180/65.22
(58) Field of Classification Search ............... 701/22, 701/51, 54, 56, 59; 477/2, 3, 5, 15, 109, 477/140; 903/945, 947; 180/338, 65.2
See application file for complete search history.

(56) References Cited

U.S. PATENT DOCUMENTS
5,833,570 A * 11/1998 Tabata et al. .................. 477/3
(Continued)

FOREIGN PATENT DOCUMENTS
| JP | 05-292603 A | 11/1993 |
| JP | 2003-041971 A | 2/2003 |
| JP | 2007-155026 A | 6/2007 |
| JP | 2008-094332 A | 4/2008 |
| JP | 2008-104306 A | 5/2008 |

(Continued)

OTHER PUBLICATIONS

International Search Report for PCT/JP2010/064818, dated Nov. 22, 2010.

*Primary Examiner* — Redhwan K Mawari

(74) *Attorney, Agent, or Firm* — Sughrue Mion, PLLC

(57) ABSTRACT

A control apparatus for controlling a vehicle, the vehicle provided with: a rotating electrical machine capable of inputting or outputting a torque with respect to an input shaft; and a transmission, which is disposed between the input shaft and an output shaft coupled with an axle, which is provided with a plurality of engaging apparatuses, which transmits a torque between the input shaft and the output shaft, and which can establish a plurality of gear stages having mutually different transmission gear ratios in accordance with engagement states of the plurality of engaging apparatuses, the transmission gear ratio being a ratio between a rotational speed of the input shaft and a rotational speed of the output shaft, the vehicle control apparatus provided with: a detecting device for detecting a braking operation amount of a driver; and an input shaft torque controlling device for controlling a torque of the input shaft such that in cases where the detected braking operation amount changes in a reducing direction which promotes a reduction in a braking force applied to the vehicle in a coast regeneration speed change period in which the gear stage is changed at the time of coast regeneration of the rotating electrical machine, a change in torque of the output shaft accompanied by the change in the braking operation amount is suppressed.

10 Claims, 13 Drawing Sheets

U.S. PATENT DOCUMENTS

| | | | |
|---|---|---|---|
| 5,951,614 A * | 9/1999 | Tabata et al. | 701/54 |
| 2004/0192494 A1* | 9/2004 | Ozeki et al. | 477/3 |
| 2007/0270277 A1* | 11/2007 | Ortmann et al. | 477/5 |
| 2008/0208422 A1* | 8/2008 | Shibata et al. | 701/54 |

FOREIGN PATENT DOCUMENTS

| | | |
|---|---|---|
| JP | 2008-207690 A | 9/2008 |
| JP | 2010-074886 A | 4/2010 |

* cited by examiner

| Gear stage | CL1 | CL2 | CL3 | BR1 | BR2 | F1 |
|---|---|---|---|---|---|---|
| 1st-speed | ○ | | | | ◎ | ○ |
| 2nd-speed | ○ | | | ○ | | |
| 3rd-speed | ○ | ○ | | | | |
| 4the-speed | | ○ | | ○ | | |
| Reverse | | | ○ | | ○ | |
| Neutral | | | | | | |

VEHICLE CONTROL APPARATUS

TECHNICAL FIELD

The present invention relates to a vehicle control apparatus for controlling a vehicle which is provided with: a rotating electrical machine capable of functioning as a power source; and a transmission coupled with the power source.

BACKGROUND ART

As this type of apparatus, there has been suggested an apparatus for suppressing the variation of an output shaft torque at the time of coast down speed change (refer to a patent document 1). According to the control apparatus of a drive apparatus for a vehicle disclosed in the patent document 1, it is possible to suppress the variation of the output shaft torque by reducing the regenerative torque of a motor in an inertia phase at the time of coast down speed change.

Incidentally, there are also such disclosures that the output of a driving force source is increased if downshifting is performed at the time of coast run and that an output control element is gradually changed to increase the rotational sped of the driving force source at a predetermined change rate (e.g. refer to a patent document 2).

Moreover, there is also the disclosure of a technology of not proceeding with the downshifting if a braking operation is performed (e.g. refer to a patent document 3).

Moreover, there has been also suggested such a technology that the regenerative torque is limited in the case of shifting gears at the time of coast deceleration in a hybrid vehicle equipped with a motor and a transmission (e.g. refer to a patent document 4).

PRIOR ART DOCUMENT

Patent Document

Patent document 1: Japanese Patent Application Laid Open No. 2008-207690
Patent document 2: Japanese Patent Application Laid Open No. 2003-041971
Patent document 3: Japanese Patent Application Laid Open No. 2007-155026
Patent document 4: Japanese Patent Application Laid Open No. 2008-094332

DISCLOSURE OF INVENTION

Subject to be Solved by the Invention

If the braking operation is canceled in regeneration coast down speed change accompanied with the braking operation of a driver, the regenerative torque by the motor is reduced along with this cancellation operation, so that the deceleration of the vehicle temporarily decreases.

On the other hand, although the variation of the output shaft torque in a torque phase or an inertia phase can be suppressed to some extent, for example, by the technology or the like disclosed in the patent document 1, there would be a practical difficulty in suppressing it to zero, or to the extent that it can be considered zero.

Therefore, in this case, re-deceleration after the decrease in the deceleration of the vehicle occurs, which does not occur if the braking operation is not canceled. In other words, the apparatus disclosed in the patent document 1 has such a technical problem that if the braking operation is canceled in the regeneration coast down speed change, a shock perceived by the driver relatively increases, thus causing deterioration in drivability. The problem would be the same even in the technologies disclosed in the patent documents 2 to 4.

In view of the aforementioned problems, it is therefore an object of the present invention to provide a vehicle control apparatus capable of suppressing the variation of the output shaft torque in the regeneration coast speed change period, with or without the braking operation.

Means for Solving the Subject

The above object of the present invention can be achieved by a vehicle control apparatus for controlling a vehicle, the vehicle provided with: a rotating electrical machine capable of inputting or outputting a torque with respect to an input shaft; and a transmission, which is disposed between the input shaft and an output shaft coupled with an axle, which is provided with a plurality of engaging apparatuses, which transmits a torque between the input shaft and the output shaft, and which can establish a plurality of gear stages having mutually different transmission gear ratios in accordance with engagement states of the plurality of engaging apparatuses, the transmission gear ratio being a ratio between a rotational speed of the input shaft and a rotational speed of the output shaft, the vehicle control apparatus provided with: a detecting device for detecting a braking operation amount of a driver; and an input shaft torque controlling device for controlling a torque of the input shaft such that in cases where the detected braking operation amount changes in a reducing direction which promotes a reduction in a braking force applied to the vehicle in a coast regeneration speed change period in which the gear stage is changed at the time of coast regeneration of the rotating electrical machine, a change in torque of the output shaft accompanied by the change in the braking operation amount is suppressed.

The vehicle of the present invention is provided with: the rotating electrical machine; and the transmission which can establish the plurality of gear stages by using the plurality of engaging apparatuses.

The rotating electrical machine of the present invention is an apparatus which can adopt practical aspects such as a motor generator and which allows the output of the torque to the input shaft (namely, which means the supply of a driving torque to the axle) and the input of the torque via the input shaft (namely, which means electric power regeneration (electricity generation)).

The transmission of the present invention is an apparatus which can adopt practical aspects such as various ECTs (Electronic Controlled Transmissions), provided with the plurality of engaging apparatuses (e.g. a clutch mechanism and a brake mechanism of a hydraulic engagement wet multi-plate type, or the like) in a torque transmission route between the input shaft and the output shaft connected to the axle. The transmission can establish the plurality of gear stages having mutually different transmission gear ratios, in accordance with the engagement state of each of the plurality of engaging apparatuses.

Incidentally, from the standpoint of a positional relation among the input shaft, the output shaft and the transmission, the input shaft means the input shaft of the transmission, and the output shaft means the output shaft of the transmission.

The vehicle control apparatus of the present invention is an apparatus for controlling such a vehicle, and it can adopt practical aspects such as one or more CPUs (Central Processing Unit), MPUs (Micro Processing Unit), ECUs (Electronic Controlled Unit), various processors or various controllers.

Incidentally, various memory devices such as a ROM (Read Only Memory), a RAM (Random Access Memory), a buffer memory or a flash memory, may be further built in or attached to the above devices as occasion demands.

According to the vehicle control apparatus of the present invention, the braking operation amount of the driver is detected by the detecting device.

The "braking operation amount" detected by the detecting device means the amount of operation by an appropriate operating device, which is associated with the braking force applied to the vehicle in a one-to-one, one-to-many, many-to-one or many-to-many manner. For example, it means the amount of stepping on a brake pedal as a preferable form.

Incidentally, the "detection" of the detecting device has both meanings of direct detection and indirect detection. In other words, the detecting device may be a detecting device, such as a sensor, capable of detecting the amount of stepping on the brake pedal, or it may be a device capable of indirectly gauging the braking operation amount by receiving an electrical signal from various detecting devices of this type.

In a period in which coast deceleration is performed as inertia deceleration accompanied with an operation of totally closing an accelerator pedal, the electric power regeneration by the regenerative torque of the rotating electrical machine, so-called coast regeneration, can be performed. The coast regeneration can be performed with or without the aforementioned driver's braking operation (as a simple example, stepping on the brake pedal).

On the other hand, the regenerative torque of the rotating electrical machine is a type of braking force acting in a direction of stopping the vehicle. Therefore, the braking operation amount, which reflects the driver's aggressive braking intention, generally correlates with the regenerative torque of the rotating electrical machine. As a preferable form, its large or small magnitude corresponds to the large or small regenerative torque of the rotating electrical machine, respectively, in a one-to-one, one-to-many, many-to-one or many-to-many manner. Incidentally, the regenerative torque is a negative torque. Thus, "large" means "small" as an absolute torque value considering its positive and negative sign.

On the other hand, in the coast regeneration period as the period in which the coast regeneration is performed, the gear stage can be changed to the side that the rotational speed of the input shaft is increased, i.e. so-called downshifting can be performed, in accordance with the deceleration state of the vehicle, preferably in accordance with a reduction in vehicle speed. At this time, before or after the change in the gear stage (hereinafter referred to as "speed change" as occasion demands), the rotational speed of the input shaft (which uniquely means the rotational speed of the rotating electrical machine) changes from a synchronous rotational speed corresponding to the gear stage before the speed change to a synchronous rotational speed corresponding to the gear stage after the speed change.

By the way, in the coast speed change period accompanied with the driver's braking operation, the braking operation amount of the braking operation changes in the reducing direction in some cases. Here, the wording that "the braking operation amount changes in the reducing direction" means, for example, that the amount of stepping on the brake pedal changes to a brake-off corresponding value as a preferable form, i.e. that the driver releases the brake pedal or performs similar actions so that a stepping force applied to the brake pedal substantially becomes zero or approximately zero. Alternatively, the wording that "the braking operation amount changes in the reducing direction" means, for example, that the amount of stepping on the brake pedal significantly decreases in a brake-on area (at this time, "significantly" means the degree of the extent that there can be the change in the regenerative torque which cannot be ignored in practice). The braking operation is a driver's action, so that the change in the braking operation amount in the reducing direction can occur independently of the progress of downshifting in the coast regeneration speed change period.

Here, as for the reduction in the braking operation amount in the coast regeneration speed change period, the torque of the output shaft (hereinafter referred to as "output shaft torque" as occasion demands) increases (i.e. approaches a zero torque) with an increase in torque of the input shaft (hereinafter referred to as "input shaft torque" as occasion demands) caused by the reduction in the regenerative torque described above, and the deceleration of the vehicle decreases at least temporarily.

On the other hand, of the speed change period of the transmission, in a so-called torque phase and a so-called inertia phase, which are periods in which the rotational speed of the rotating electrical machine is changed from the synchronous rotational speed corresponding to the gear stage before the speed change to the synchronous rotational speed corresponding to the gear stage after the speed change, one portion of the input shaft torque is consumed by an inertia torque in an input inertial system of the transmission including this rotating electrical machine, so that the input shaft torque decreases again. As a result, the output shaft torque also decreases with respect to a request value, to a greater or lesser extent.

In other words, if the braking operation amount changes in the reducing direction in the coast regeneration speed change period, the torque of the input shaft decreases again after the increase accompanied with the reduction in the regenerative torque described above. With that, the variation range of the torque of the output shaft becomes relatively large, and the torque variation of the output shaft likely increases to the extent that it can be perceived by the driver.

Such a problem occurs due to the original control of the electric power regeneration of the rotating electrical machine, and it is an entirely new problem which occurs even if it is controlled to reduce the regenerative torque in the coast regeneration speed change period in order to suppress the torque variation of the output shaft in the inertia phase.

Thus, according to the vehicle control apparatus of the present invention, the input shaft torque controlling device controls the input shaft torque such that the variation of the output shaft torque due to the braking operation amount is suppressed if the detected braking operation amount changes in the reducing direction in the coast regeneration speed change period.

By that the input shaft torque controlling device controls the input shaft torque, for example, the reduction in the regenerative torque (i.e. the increase in the input shaft torque because the regenerative torque is a negative torque) due to the change in the braking operation amount in the reducing direction is suppressed. Alternatively, the increase in the regenerative torque (i.e. the reduction in the input shaft torque) after the regenerative torque decreases is suppressed. As a result, the variation of the output shaft torque due to the change in the braking operation amount in the reducing direction is suppressed or mitigated. In other words, according to the vehicle control apparatus of the present invention, the variation of the output shaft torque can be suppressed.

Incidentally, as for the wording that "the variation of the torque of the output shaft accompanied by the change in the braking operation amount is suppressed", it is considered that if the speed change is performed while the vehicle speed (i.e. a request output requested of the output shaft of the transmission) is maintained before and after the speed change (i.e. so-called equal power speed change) in this type of vehicle, the torque of the output shaft also appropriately changes with the transition of the input shaft rotational speed of the transmission to the synchronous rotational speed associated with the gear stage before and after the speed change. In other words, the torque change in the output shaft, which is a suppression target in the present invention, means not such a torque change that should exist under normal circumstances, but a change in the output shaft torque which occurs with the change in the input shaft torque in cases where the braking operation amount changes in the reducing direction.

In one aspect of the vehicle control apparatus of the present invention, the input shaft torque controlling device controls the torque of the input shaft in cases where the braking operation amount changes from a value in which the braking force is to be applied to a value in which the braking force is not to be applied, as the cases where the detected braking operation amount changes in the reducing direction.

The variation of the input shaft torque which promotes the variation of the output shaft torque remarkably increases, for example, in cases where the braking operation amount changes from the value in an area in which the braking force is to be applied to the value in which the braking force is not to be applied (e.g. a dead-zone area including a zero value, or the like), such as cases where the brake pedal is released. Therefore, according to this aspect, it is possible to effectively suppress the change in the output shaft torque.

In another aspect of the vehicle control apparatus of the present invention, the input shaft torque controlling device controls the torque of the input shaft in cases where the detected braking operation amount changes in the reducing direction in a change period of changing the gear stage.

According to this aspect, the torque control of the input shaft described above is performed in the change period of changing the gear stage, as a period in which the gear stage is actually changed after a speed-change request is made, particularly as the period in which the gear stage is changed. Therefore, therefore, it is efficient and effective.

Incidentally, in this aspect, the input shaft torque controlling device may control the torque of the input shaft in cases where the detected braking operation amount changes in the reducing direction in a period from when a request to change the gear stages is made to when a torque phase which is one portion of the coast regeneration speed change period starts, as the change period.

If the braking operation amount changes in the reducing direction before the torque phase is started and the input shaft torque increases (the regenerative torque of the rotating electrical machine decreases), the scale of a torque shock becomes large, wherein the torque shock is caused by the reduction in the output shaft torque in a period from the start of the torque phase to the inertial phase. Therefore, in this case, the input shaft torque controlling device of the present invention operates remarkably effectively.

Incidentally, the effect of the input shaft torque controlling device of the present invention is obviously ensured even if the braking operation amount changes in the reducing direction in any time area of the coast regeneration speed change period. Therefore, in cases where the braking operation amount changes in the reducing direction before the start period of the torque phase, a measure to increase the degree of the suppression associated with the suppression of the change in the output shaft torque in the input shaft torque controlling device or similar measures may be taken.

In another aspect of the vehicle control apparatus of the present invention, the input shaft torque controlling device limits an increasing speed of the torque of the input shaft in comparison with cases where the detected braking operation amount changes in the reducing direction in a period other than the coast regeneration speed change period.

According to this aspect, the increasing speed of the torque of the input shaft is limited in comparison with cases where the braking operation amount changes in the reducing direction in the period other than the coast regeneration speed change period. Thus, even if the braking operation amount changes in the reducing direction, it is possible to suppress a sudden change in the input shaft torque, and it is possible to mitigate the torque shock caused by the reduction in the output shaft torque in the torque phase and the inertia phase.

In another aspect of the vehicle control apparatus of the present invention, it is further provided with a suppressing device for suppressing the change in torque of the output shaft by reducing a regenerative torque of the rotating electrical machine, in at least one of a torque phase and an inertia phase which constitute one portion of the coast regeneration speed change period, the input shaft torque controlling device correcting an amount of reduction in the regenerative torque associated with the suppressing device to a further reduction side According to this aspect, the reduction of the output shaft torque which occurs in at least one of the torque phase and the inertia phase is suppressed by the suppressing device, due to the correction to the reduction side of the regenerative torque (the correction to the increase side of the input shaft torque). Therefore, it is possible to effectively suppress the variation of the output shaft torque in the coast regeneration speed change period.

On the other hand, the input shaft torque controlling device corrects the amount of reduction in the regenerative torque associated with the suppressing device to the further reduction side in cases where the braking operation amount changes in the reducing direction. Therefore, even if the input shaft torque suddenly changes with the change in the braking operation amount in the reducing direction, it is possible to suppress a drop in the output shaft torque in the inertia phase and the torque phase after that, resulting in preferable suppression of the variation of the output shaft torque.

In another aspect of the vehicle control apparatus of the present invention, it is further provided with a suppressing device for suppressing the change in torque of the output shaft by reducing a regenerative torque of the rotating electrical machine, in at least one of a torque phase and an inertia phase which constitute one portion of the coast regeneration speed change period, the input shaft torque controlling device limiting an increasing speed of the torque of the input shaft in comparison with cases where the detected braking operation amount changes in the reducing direction in a period other than the coast regeneration speed change period, the input shaft torque controlling device correcting an amount of reduction in the regenerative torque associated with the suppressing device to a further reduction side.

According to this aspect, the control associated with the control of the increasing speed of the input shaft torque described above and the control of the correction to the reduction side associated with the amount of reduction in the regenerative torque described above are performed in synchronization with each other. In other words, it is possible to prevent the drop in the output shaft torque in the torque phase and the inertia phase while mitigating the sudden change in the input shaft torque accompanied with the change in the braking operation amount in the reducing direction, so that the variation of the output shaft torque can be suppressed more effectively.

In another aspect of the vehicle control apparatus of the present invention, it is further provided with an engagement hydraulic pressure controlling device for changing an engagement hydraulic pressure of the engaging apparatus associated with the gear stage after speed change to be high or low, in accordance with a high or low change speed of the torque of the input shaft, respectively.

According to this aspect, the engagement hydraulic pressure applied to the engaging apparatus associated with the gear stage after the speed change is corrected to be low or high with respect to the high or low change speed of the torque of the input shaft, respectively. Therefore, in changing the braking operation amount in the reducing direction, it is possible to mitigate the sudden change in the input shaft torque.

However, the application characteristics of the engagement hydraulic pressure influence the length of the speed change period. Thus, in practice, in order that the length of the speed change period is included within an acceptable range, a correction aspect, a correction value, a correction coefficient, and the like associated with the correction of the engagement hydraulic pressure of this type may be set on the basis of experiments, experiences, theories, simulations, or the like in advance.

In another aspect of the vehicle control apparatus of the present invention, the vehicle is further provided with a storage battery device capable of inputting or outputting an electric power with respect to the rotating electrical machine, the vehicle control apparatus is further provided with a regenerative torque controlling device for controlling a regenerative torque of the rotating electrical machine at the time of the coast regeneration within limitations defined in accordance with at least one of amount of storage and temperature of the storage battery device, and the input shaft torque controlling device controls the torque of the input shaft in accordance with a control state of the regenerative torque by the regenerative torque controlling device.

According to this aspect, the regenerative torque in the coast generation is controlled in accordance with at least one of the amount of storage and the temperature of the storage battery device.

Here, for example, if the storage battery device is nearly in a fully charged state, the requested electric power regeneration amount of the rotating electrical machine is relatively small, and if the storage battery device is nearly in a fully discharged state, the requested electric power regeneration amount of the rotating electrical machine is relatively large. Moreover, if the temperature of the storage battery device deviates from a predetermined recommended area set for a low-temperature side, a high-temperature side, or both sides or in similar cases, an electric power allowed to be supplied to the storage battery device unit per time (i.e. simply speaking, an input limit value Win) is limited, and the amount of electric power regeneration is limited.

On the other hand, the magnitude of the requested electric power regeneration amount means the magnitude of the regenerative torque at the time of coast regeneration. If the regenerative torque is large, the degree of the change in the regenerative torque becomes large by that much in cases where the braking operation amount changes in the reducing direction. Therefore, depending on the control state of the regenerative torque, the degree of the variation of the output torque changes in cases where the braking operation amount changes in the reducing direction in the coast regeneration speed change period.

Here, according to this aspect, the input shaft torque is controlled by the input shaft torque controlling device in accordance with the control state of the regenerative torque, so that it is possible to suppress the variation of the output shaft torque more efficiently.

In another aspect of the vehicle control apparatus of the present invention, the vehicle is provided with: an internal combustion engine; another rotating electrical machine which is different from the rotating electrical machine, as a reaction element for providing a reaction torque for the internal combustion engine; and a differential mechanism, which is provided with a plurality of rotational elements including rotational elements each of which is coupled with respective one of the internal combustion engine, the rotating electrical machine and the other rotating electrical machine and which can change a ratio between a rotational speed of the internal combustion engine and a rotational speed of the rotating electrical machine in a stepless manner.

According to this aspect, the vehicle constitutes one example of a so-called hybrid vehicle, and it can drive the internal combustion engine, for example, along an optimum fuel consumption operating line in which a fuel consumption rate is minimal, by using a stepless speed change function by the differential mechanism. Thus, coupled with the practical benefits of the vehicle control apparatus of the present invention, the energy efficiency of the entire vehicle can be ensured to be good.

The operation and other advantages of the present invention will become more apparent from the embodiments explained below.

BEST MODE FOR CARRYING OUT THE INVENTION

Embodiments of the Invention

Hereinafter, various embodiments of the present invention will be explained with reference to the drawings.

First Embodiment

Structure of Embodiment

Figure 1:
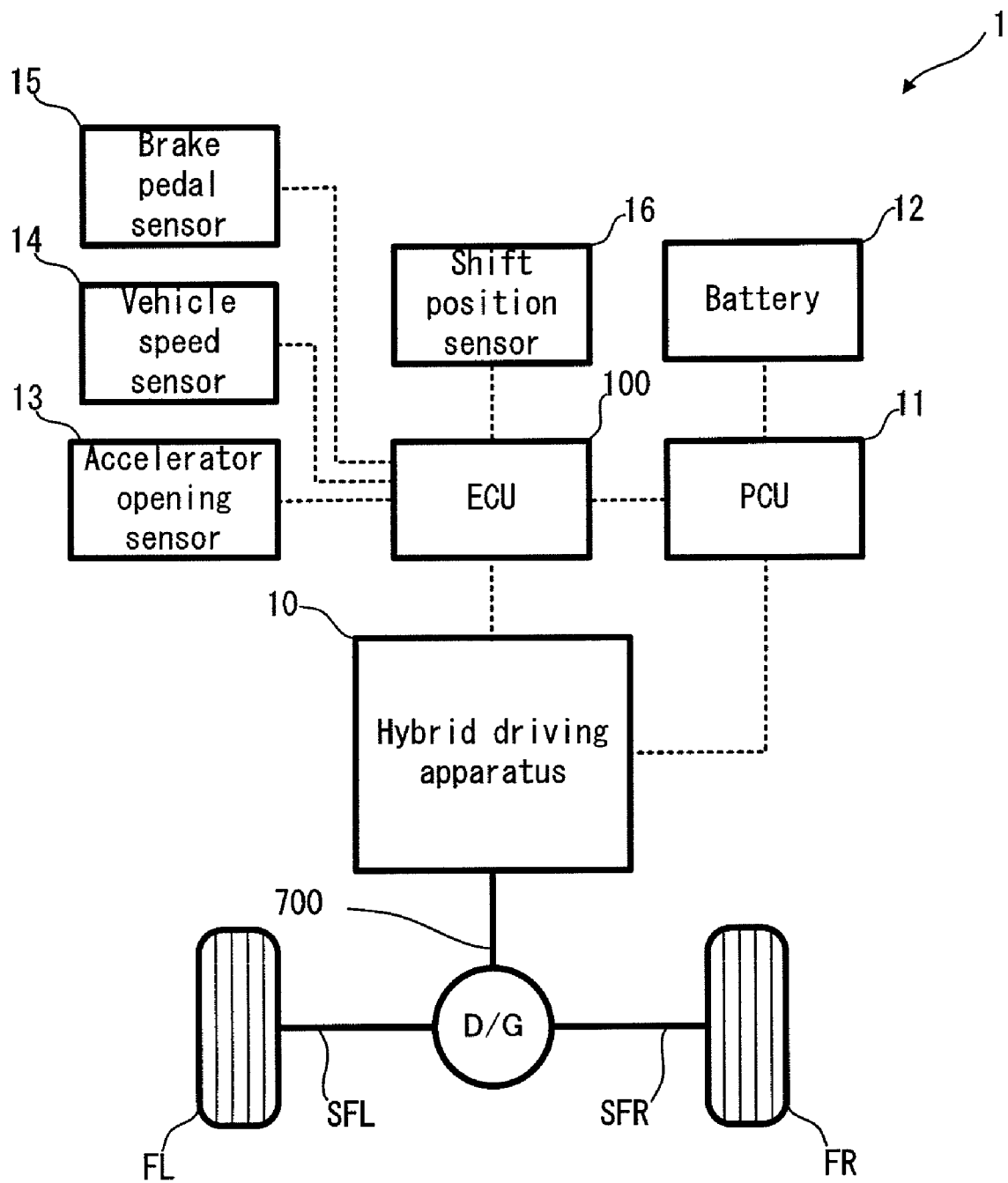
FIG. 1 is a schematic configuration diagram conceptually showing the structure of a hybrid vehicle in a first embodiment of the present invention.

Firstly, with reference to FIG. 1, an explanation will be given on the structure of a hybrid vehicle 1 in a first embodiment of the present invention. FIG. 1 is a schematic configuration diagram conceptually showing the structure of the hybrid vehicle 1.

In FIG. 1, the hybrid vehicle 1 is a hybrid vehicle as one example of the "vehicle" of the present invention, provided with: an ECU 100; a PCU (Power Control Unit) 11; a battery 12; an accelerator opening sensor 13; a vehicle speed sensor 14; a brake pedal sensor 15; a shift position sensor 16 and a hybrid drive apparatus 10.

The ECU 100 is provided with a CPU (Central Processing Unit), a ROM (Read Only Memory), a RAM and the like. The ECU 100 is an electronic control unit capable of controlling the operations of each part of the hybrid vehicle 1. The ECU 100 is one example of the "vehicle control apparatus" of the present invention. The ECU 100 can perform speed change control described alter, in accordance with a control program stored in the ROM. Incidentally, the ECU 100 is a unified or one-body electronic control unit which functions as one example of each of the "detecting device", the "input shaft torque controlling device", the "suppressing device", the "engagement hydraulic controlling device", and the "regenerative torque controlling device" of the present invention, and all the operations of the respective devices are performed by the ECU 100. However, the physical, mechanical and electrical configurations of each of the devices of the present invention are not limited to this. For example, each of the devices may be constructed as various computer systems such as various controllers or microcomputer apparatuses, various processing units, a plurality of ECUs, and the like.

The hybrid drive apparatus 10 is a power train unit for driving the hybrid vehicle 1 by supplying a drive torque as a driving force to a left axle SFL (corresponding to a left front wheel FL) and a right axle SFR (corresponding to a right front wheel FR) as the axle of the hybrid vehicle 1. The detailed structure of the hybrid drive apparatus 10 will be described later. Incidentally, each axle is coupled with an output shaft 700, which is the power output shaft of the hybrid drive apparatus 10, via a differential D/G as a final reduction gear mechanism.

The PCU 11 includes a not-illustrated inverter which can convert direct-current (DC) power extracted from the battery 12 to alternating-current (AC) power and supply it to a motor generator MG1 and a motor generator MG2 described later and which can convert AC power generated by the motor generator MG1 and the motor generator MG2 to DC power and supply it to the battery 12. The PCU 11 is a power control unit capable of controlling the input/output of the electric power between the battery 12 and each motor generator, or the input/output of the electric power between the motor generators (i.e. in this case, the electric power is given and received between the motor generators without via the battery 12). The PCU 11 is electrically connected to the ECU 100, and the operations of the PCU 11 are controlled by the ECU 100.

The battery 12 is a chargeable battery unit which has such a structure that a plurality of unit battery cells are series-connected and which functions as an electric power source associated with the electric power for the power running of the motor generator MG1 and the motor generator MG2. The battery 12 is one example of the "storage battery device" of the present invention.

The accelerator opening sensor 13 is a sensor capable of detecting an accelerator opening degree Ta which is the operation amount of a not-illustrated accelerator pedal of the hybrid vehicle 1. The accelerator opening sensor 13 is electrically connected to the ECU 100, and the detected accelerator opening degree Ta is referred to by the ECU 100 with a constant or irregular period.

The vehicle speed sensor 14 is a sensor capable of detecting a vehicle speed Vh of the hybrid vehicle 1. The vehicle speed sensor 14 is electrically connected to the ECU 100, and the detected vehicle speed Vh is referred to by the ECU 100 with a constant or irregular period.

The brake pedal sensor 15 is a sensor capable of detecting a brake pedal stepping amount Tb which is the operation amount (stepping amount) of a not-illustrated brake pedal. The brake pedal is a braking device in which its operation amount is associated with a braking force to be applied to the hybrid vehicle 1. The brake pedal stepping amount Tb as the operation amount of the brake pedal is one example of the "braking operation amount" of the present invention. The brake pedal sensor 15 is electrically connected to the ECU 100, and the detected brake pedal stepping amount Tb is referred to by the ECU 100 with a constant or irregular period.

Incidentally, further to that, the hybrid vehicle 1 is provided with an ECB (Electronic Controlled Braking System) which can individually apply a friction braking force to each wheel, and its friction braking realized by hydraulic drive and regenerative braking by the motor generator MG2 described later are performed in synchronization with each other. However, as for the structure of the ECB and its operation aspect, the explanation thereof will be omitted in order to prevent complicated explanation as they correlate poorly with the nature of the present invention.

The shift position sensor 16 is a sensor capable of detecting a shift position for defining the operation mode of an ECT 400 described later. The shift position sensor 16 is electrically connected to the ECU 100, and the detected shift position is referred to by the ECU 100 with a constant or irregular period.

Figures 2, 3:
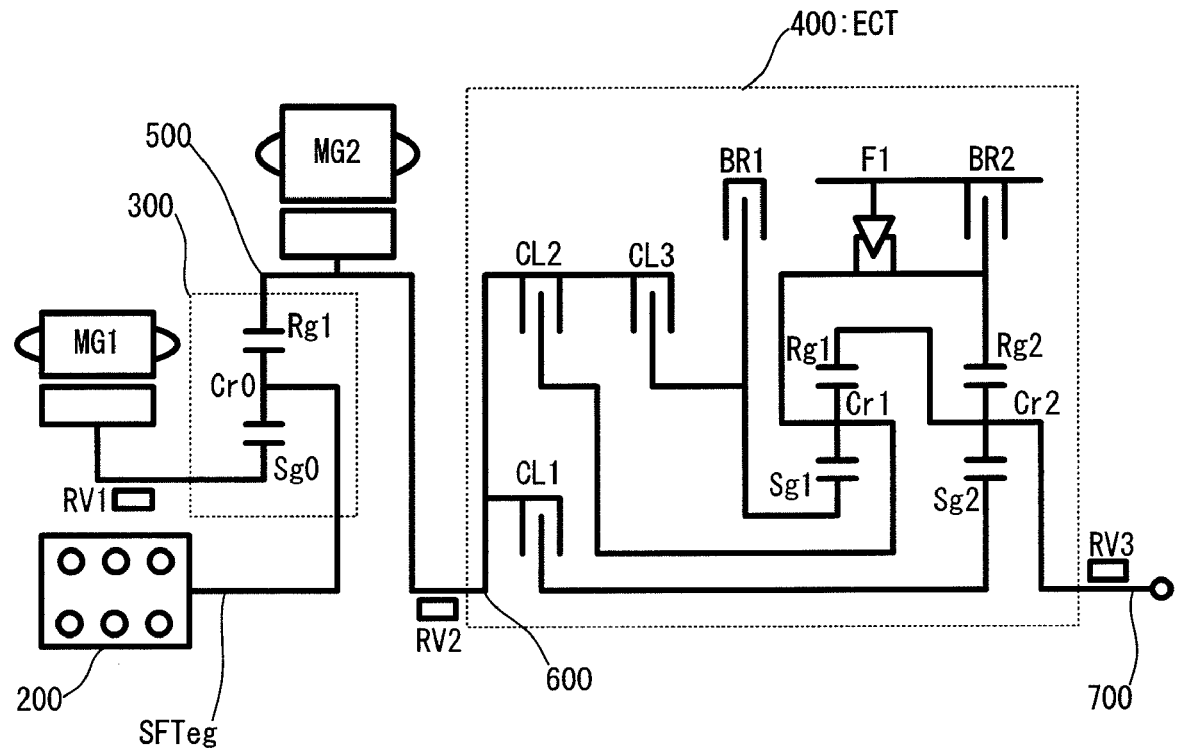
FIG. 2 is a schematic configuration diagram conceptually showing the structure of a hybrid drive apparatus in the hybrid vehicle in FIG. 1.
FIG. 3 is an engagement table illustrating a relation between a gear stage and an engagement state of an engaging apparatus of a transmission in the hybrid vehicle in FIG. 2.

Now, with reference to FIG. 2, the detailed structure of the hybrid drive apparatus 10 will be explained. FIG. 2 is a schematic configuration diagram conceptually showing the structure of the hybrid drive apparatus 10. Incidentally, in FIG. 2, the overlap points with FIG. 1 will carry the same reference numerals, and the explanation thereof will be omitted as occasion demands.

In FIG. 2, the hybrid drive apparatus 10 is provided with an engine 200, a power dividing mechanism 300, a motor generator MG1 (hereinafter abbreviated to as a "MG1" as occasion demands), a motor generator MG2 (hereinafter abbreviated to as a "MG2" as occasion demands), an engine output shaft SFTeg, an ECT 400, a drive shaft 500, an input shaft 600 and an output shaft 700.

The engine 200 is a V-type six-cylinder gasoline engine as one example of the "internal combustion engine" of the present invention, which functions as one power source of the hybrid vehicle 1. The engine 200 is a known gasoline engine, and the detailed structure thereof will be omitted here. An engine torque Te as the output power of the engine 200 is coupled with the engine input shaft SFTeg of the hybrid drive apparatus 10 via a not-illustrated crankshaft. Incidentally, the engine 200 is merely one example of the practical aspect which can be adopted by the internal combustion engine of the present invention. As the practical aspect of the internal combustion engine of the present invention, not only the engine 200 but also known various engines can be adopted.

The motor generator MG1 is a motor generator, provided with a power running function for converting electrical energy to kinetic energy and a regeneration function for converting kinetic energy to electrical energy. The motor generator MG1 is one example of "another rotating electrical machine" of the present invention.

The motor generator MG2 is a motor generator as one example of the "rotating electrical machine" of the present invention having a bigger body size than the motor generator MG1. As in the motor generator MG1, the motor generator MG2 is provided with the power running function for converting electrical energy to kinetic energy and the regeneration function for converting kinetic energy to electrical energy.

Incidentally, the motor generators MG1 and MG2 may be constructed as synchronous motor generators. Each of them may have the structure that it is provided with a rotor having a plurality of permanent magnets on an outer circumferential surface and a stator in which a three-phase coil for forming a rotating magnetic field is wound; however, of course, it may have a different structure.

The power dividing mechanism 300 is a planetary gear mechanism as one example of the "differential mechanism" of the present invention.

The power dividing mechanism 300 is provided with: a sun gear Sg0 as one example of the "rotational element" of the present invention, disposed in the central part; a ring gear Rg0 as another example of the "rotational element" of the present invention, concentrically disposed on the outer circumference of the sun gear Sg0; a plurality of pinion gears (not illustrated), disposed between the sun gear Sg0 and the ring gear Rg0 and revolving around the sun gear Sg0 on the outer circumference of the sun gear Sg0 while rotating on its axis; and a carrier Cr0 as another example of the "rotational element" of the present invention, for pivotably supporting the rotating shaft of each pinion gear.

The sun gear Sg0 is coupled with the rotor of the motor generator MG1 so as to share its rotating shaft, and its rotational speed is equivalent to the rotational speed of the MG1, i.e. a MG1 rotational speed Ng.

On the other hand, the ring gear Rg0 is coupled with the drive shaft 500. The drive shaft 500 is coupled with the rotor of the motor generator MG2 so as to share its rotating shaft. Therefore, the MG2 can input and output a torque between the MG2 and the drive shaft 500.

Incidentally, the input of the torque means that the motor generator MG2 becomes a driven element and that electric power regeneration is performed by the MG2 outputting a regenerative torque. Moreover, the output of the torque means that at least one portion of an output shaft torque Tout of the hybrid drive apparatus 10 (i.e. one example of the "torque of the output shaft" of the present invention), i.e. a MG2 torque Tm, is supplied to the drive shaft 500. The drive shaft 500 is connected to the input shaft 600 (i.e. one example of the "input shaft" of the present invention) which is the power input shaft of the ECT 400.

On the other hand, the carrier Cr0 is coupled with the engine input shaft SFTeg which is coupled with the crankshaft of the engine 200. The rotational speed of the carrier Cr0 is equivalent to the engine rotational speed NE of the engine 200.

The ECT 400 is an electronically-controlled transmission as one example of the "transmission" of the present invention, which is provided with a plurality of pairs of engaging apparatuses and which can establish a plurality of gear stages or shift steps having different transmission gear ratios $\gamma$ depending on their engagement state.

Incidentally, the transmission gear ratio $\gamma$ is a ratio between an input shaft rotational speed Nin as the rotational speed of the input shaft 600 and an output shaft rotational speed Nout as the rotational speed of the output shaft 700 ($\gamma$=Nin/Nout). As described above, the input shaft 600 is connected to the drive shaft 500 as the power output shaft of the power dividing mechanism 300, so that the input shaft rotational speed Nin is equivalent to the rotational speed of the drive shaft 500, i.e. a MG2 rotational speed Nm as the rotational speed of the motor generator MG2. Moreover, in the same manner, an input shaft torque Tin, which is a torque acting on the input shaft 600, is equivalent to a torque acting on the drive shaft 500.

The ECT 400 is provided with: a compound planetary gear mechanism obtained by combining two types of differential mechanisms; wet multi-plate clutch mechanisms of a CL1, a CL2 and a CL3 (each of which is one example of the "engaging apparatus" of the present invention); a one-way clutch F1; wet multi-plate brake mechanisms of a BR1 and a BR2. Among them, a pair of engagement elements (incidentally, although having said a pair, the engagement elements are not limited to two) of each of the wet multi-plate clutch mechanisms, the one-way clutch and the wet multi-plate brake mechanisms are selectively controlled between an engagement state and a disengagement state by the action of a not-illustrated hydraulic actuator (not illustrated).

Here, the hydraulic actuator for controlling a hydraulic pressure, which defines the engagement force of the clutch mechanism and the brake mechanism, is electrically connected to the ECU 100, and the ECU 100 can arbitrarily change the gear stage of the ECT 400 via the operation control of the hydraulic actuator. The details of the speed change by the ECT 400 will be described later.

In the ECT 400, the input shaft 600 is fixed to one engagement element (i.e. clutch plate) of each of the clutches CL1, CL2 and CL3.

On the other hand, the other engagement element (which is also a clutch plate) of the clutch CL1 is coupled with a sun gear Sg2 as one rotational element of one planetary gear unit (which is a planetary gear unit on the right side in FIG. 2 and which is hereinafter referred to as a "second differential mechanism" as occasion demands) which constitutes the differential mechanism. Moreover, the other engagement element of the clutch CL2 is coupled with a carrier Cr1 as one rotational element of the other planetary gear unit (which is a planetary gear unit on the left side in FIG. 2 and which is hereinafter referred to as a "first differential mechanism" as occasion demands) which constitutes the differential mechanism. Moreover, the other engagement element of the clutch CL3 is coupled with a sun gear Sg1 as another rotational element of a first planetary gear unit and one engagement element of the brake BR1. Incidentally, the other engagement element of the brake BR1 is a fixed element.

As for the brake BR2, one engagement element thereof is coupled with a ring gear Rg2 of a second planetary gear unit and the carrier Cr1 of the first planetary gear unit, and the other engagement element is a fixed element.

The one-way clutch F1 is a one-way clutch for transmitting only a power in a positive rotational direction and for idling with respect to a power in a negative rotational direction. One engagement element of the one-way clutch F1 is coupled with the carrier Cr1 of the first differential mechanism.

The first differential mechanism is a single pinion type planetary gear unit, provided with: the sun gear Sg1; a ring gear Rg1 concentrically disposed on the outer circumference of the sun gear Sg1; a plurality of pinion gears (not illustrated), disposed between the sun gear Sg1 and the ring gear Rg1 and revolving around the sun gear Sg1 on the outer circumference of the sun gear Sg1 while rotating on its axis; and the carrier Cr1 for pivotably supporting the rotating shaft of each pinion gear.

The second differential mechanism is a single pinion type planetary gear unit, provided with: the sun gear Sg2; the ring gear Rg2 concentrically disposed on the outer circumference of the sun gear Sg2; a plurality of pinion gears (not illustrated), disposed between the sun gear Sg2 and the ring gear Rg2 and revolving around the sun gear Sg2 on the outer circumference of the sun gear Sg2 while rotating on its axis; and a carrier Cr2 for pivotably supporting the rotating shaft of each pinion gear.

The first and second differential mechanisms constitute a compound planetary gear unit by that the carrier Cr1 of the first differential mechanism is coupled with the ring gear Rg2 of the second differential mechanism and by that the carrier Cr2 of the second differential mechanism is coupled with the ring gear Rg1 of the second differential mechanism. Moreover, the carrier Cr2 of the second differential mechanism is coupled with the output shaft 700 as the output shaft of the ECT 400.

In this structure, the ECT 400 can establish four types of forward gear stages in total, which are a 1st-speed stage with a transmission gear ratio of $\gamma 1$ (e.g. $\gamma 1$=about 3.2), a 2nd-speed stage with a transmission gear ratio of $\gamma 2$ (e.g. $\gamma 2$=about 1.7), a 3rd-speed stage with a transmission gear ratio of $\gamma 3$ (e.g. $\gamma 3$=about 1.0), and a 4th-speed stage (i.e. an overdrive stage) with a transmission gear ratio of $\gamma 4$ (e.g. $\gamma 4$=about 0.67), as the gear stage, by changing the engagement state of each engaging apparatus.

Incidentally, various operation modes are set in the ECT 400, and one operation mode is selected by a driver via a not-illustrated shift lever. Here, each shift range (shift position) of "P", "R", "N", "D", "3", "2" and "1" corresponds to the operation mode. For example, if the "D" range is selected, the ECU 100 selects one optimum gear stage for the operational condition of the hybrid vehicle 1 at that time point from the above four types of gear stages and makes the hybrid drive 1 run while changing the gear stage as occasion demands. Incidentally, the operation mode of the ECT 400 corresponding to each shift range is known, and the details thereof will not be mentioned herein in order to prevent complicated explanation.

Now, with reference to FIG. 3, an explanation will be given on a relation between the established gear stage and the engagement stage of each engaging apparatus of the ECT 400. FIG. 3 is an engagement table illustrating the relation between the gear stage and the engagement stage of the engaging apparatus of the ECT 400.

In FIG. 3, "○" means engagement, no mark means disengagement, and "⊙" means disengagement if an electrical stepless speed-change stage is generated and engagement if a fixed stage run is performed.

In FIG. 3, only the forward gear stages will be briefly explained. The clutch CL1 is a low-speed clutch, and the clutch CL2 is a high-speed clutch. If the clutch CL1 is in an engagement state and the clutch CL2 is in a disengagement state, the gear stage becomes the 1st-speed stage or 2nd-speed stage which is a low-speed gear stage with a relatively large transmission gear ratio. At this time, if the brake BR1 is disengaged, the gear stage becomes the 1st-speed stage, and if the brake BR1 is engaged, the gear stage becomes the 2nd-speed stage.

On the other hand, if the clutch CL1 is disengaged, the clutch CL2 is engaged, and the brake BR2 is engaged, then, the gear stage becomes the 4th-speed stage for high speed with a relatively small transmission gear ratio.

Moreover, if both the clutch CL1 and the clutch CL2 are engaged, the rotation of the sun gear Sg2 of the second differential mechanism is equal to the rotation of the ring gear Rg2 of the second differential mechanism coupled with the carrier Cr1 of the first differential mechanism, at the input shaft rotational speed Nin. In the first and second differential mechanism, the rotational speeds of two elements of the rotational elements, which constitute each of the differential mechanisms, are determined, and thus, the remaining rotational element is determined. Thus, if the rotational speed of the ring gear Rg2 matches the rotational speed of the sun gear Sg2, the rotational speed of the carrier Cr2 inevitably matches those rotational speeds. As a result, the output shaft rotational speed Nout as the rotational speed of the carrier Cr2 is equal to the input shaft rotational speed Nin, so that the 3rd-speed stage with a transmission gear ratio of $\gamma 3$ ($\approx 1$) is established.

Incidentally, the gear ratio of each of the rotational elements which constitute the ECT 400 has such a characteristic that it is appropriately changed depending on the transmission gear ratio of the gear stage to be obtained, which strays from the essential part of the present invention. Thus, in the first embodiment, its detailed value will not be mentioned. However, the transmission gear ratio of each gear stage is illustrated as described above, and the gear ratio of each rotational element for realizing the transmission gear ratio of each gear stage may be obvious.

Back in FIG. 2, the hybrid drive apparatus 10 is provided with resolvers RV1, RV2 and RV3.

The resolver RV1 is a rotational speed sensor which can detect the MG1 rotational speed Ng as the rotational speed of the MG1. The resolver RV1 is electrically connected to the ECU 100, and the detected MG1 rotational speed Ng is referred to by the ECU 100 with a constant or irregular period.

The resolver RV2 is a rotational speed sensor which can detect the MG2 rotational speed Nm as the rotational speed of the MG2. The resolver RV2 is electrically connected to the ECU 100, and the detected MG2 rotational speed Nm is referred to by the ECU 100 with a constant or irregular period. Incidentally, the MG2 rotational speed Nm is equivalent to the input shaft rotational speed Nin, as described above.

The resolver RV3 is a rotational speed sensor which can detect the output shaft rotational speed Nout as the rotational speed of the output shaft 700. The resolver RV3 is electrically connected to the ECU 100, and the detected output shaft rotational speed Nout is referred to by the ECU 100 with a constant or irregular period.

<Operations of Embodiment>
<Stepless Speed Change Function by Power Dividing Mechanism 300>

Under the aforementioned configuration, the power dividing mechanism 300 can divide the engine torque Te supplied from the engine 200 to the engine output shaft SFTeg, into the sun gear Sg0 and the ring gear Rg0 at a predetermined ratio (ratio according to the gear ratio between the gears) by using the carrier Cr0, and it can divide the power of the engine 200 into two systems. At this time, in order to make it easy to understand the operations of the power dividing mechanism 300, if a gear ratio ρ is defined as the number of teeth of the sun gear Sg0 with respect to the number of teeth of the ring gear Rg0, a torque Tes acting on the sun gear Sg0 when the engine torque Te is acted on the carrier Cr0 from the engine 200 is expressed by the following equation (1), and an engine direct torque Ter which appears in the drive shaft 500 is expressed by the following equation (2).

$$Tes = -Te \times \rho/(1+\rho) \quad (1)$$

$$Ter = Te \times 1/(1+\rho) \quad (2)$$

Figure 4:
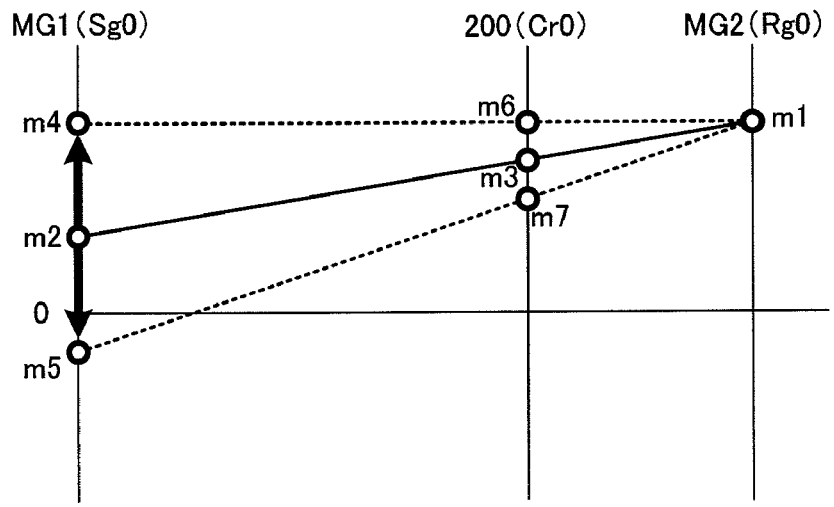
FIG. 4 is an operational nomogram illustrating one operating state of a power dividing mechanism in the hybrid drive apparatus in FIG. 2.

Now, with reference to FIG. 4, an explanation will be given on an electrical stepless speed change function by the power dividing mechanism 300. FIG. 4 is an operational nomogram illustrating one operating state of the hybrid drive apparatus 10. Incidentally, in FIG. 4, the overlap points with FIG. 2 will carry the same reference numerals, and the explanation thereof will be omitted as occasion demands.

In FIG. 4, the vertical axis shows the rotational speed, and the horizontal axis shows the motor generator MG1 (which uniquely means the sun gear Sg0), the engine 200 (which uniquely means the carrier Cr0) and the motor generator MG2 (which uniquely means the ring gear Rg0) from the left in order.

Here, as in each differential mechanism of the ECT 400 described above, the power dividing mechanism 300 is a 2-degree-of-freedom rotational planetary gear unit, provided with a plurality of rotational elements which have a mutually differential relation. If the rotational speeds of two elements of the sun gear Sg0, the carrier Cr0 and the ring gear Rg0, the rotational speed of the remaining one rotational element is inevitably determined. In other words, in the operational nomogram, the operating state of each rotational element can be shown by one operational collinear line corresponding to one operating state of the hybrid drive apparatus 10 in a one-on-one manner.

In FIG. 4, it is assumed that the operating point of the motor generator MG2, which has a unique rotational relation to the drive shaft 500 and the input shaft 600, is an operating point m1. In this case, if the operating point of the motor generator MG1 is an operating point m2, the operating point of the engine 200 coupled with the carrier Cr0, which is the remaining one rotational element, is an operating point m3. Here, for example, for easier understanding, if the operating point of the motor generator MG1 is changed to an operating point m4 and an operating point m5 while the input shaft rotational speed Nin as the rotational speed of the drive shaft 500 is maintained, then, the operating point of the engine 200 changes to an operating point m6 and an operating point m7, respectively.

In other words, in this case, by making the motor generator MG1 function as a rotational speed control mechanism, the engine 200 can be operated at a desired operating point. As described above, the power dividing mechanism 300 is a part for realizing the electrical stepless speed change function in the hybrid drive apparatus 10, and the power dividing mechanism 300 constitutes one example of the "differential mechanism" of the present invention.

Incidentally, under the electrical stepless speed change function, the operating point of the engine 200 (the operating point in this case means one operational condition of the engine 200 defined by a combination of the engine rotational speed NE and the engine torque Te) is controlled to an optimum fuel consumption operating point at which the fuel consumption rate of the engine 200 is basically minimal.

<Stepped Speed Change Function by ECT 400>

Figure 5:
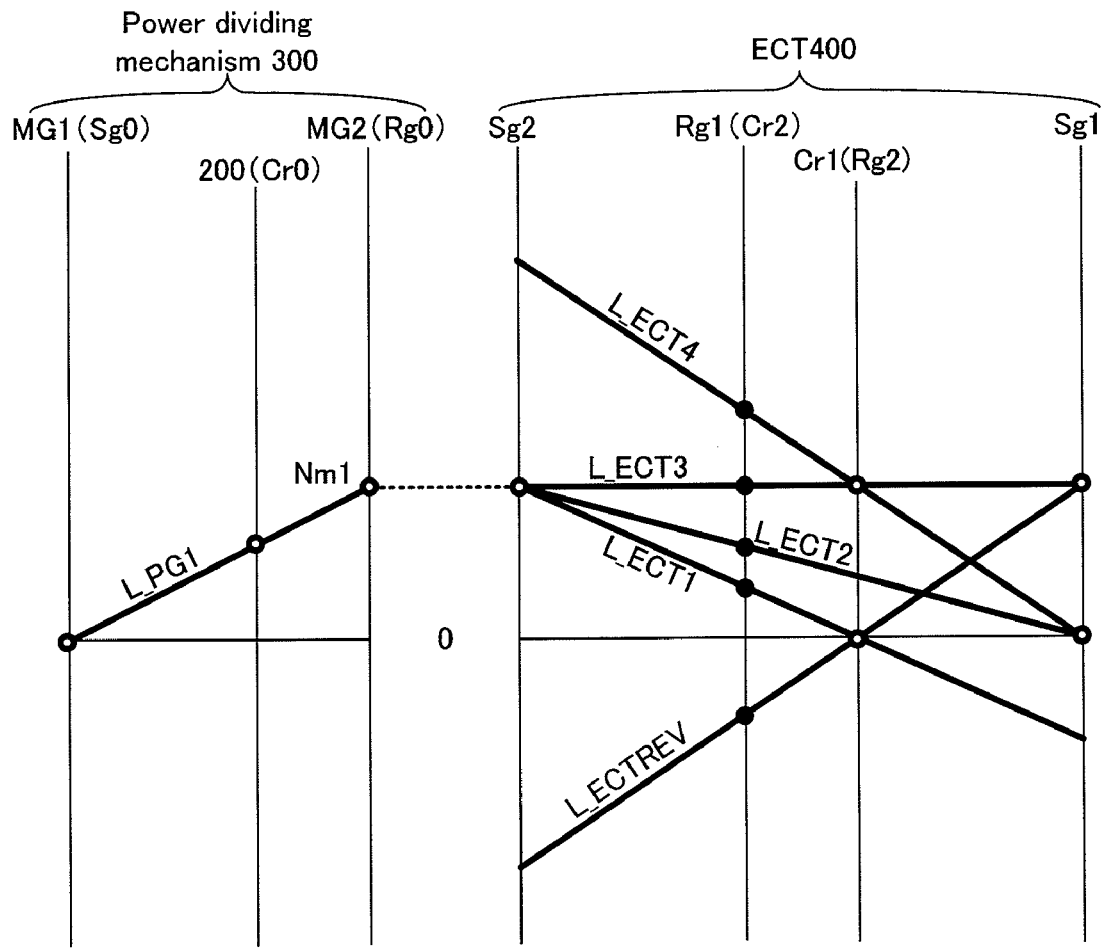
FIG. 5 is an operational nomogram illustrating one operating state of the hybrid drive apparatus in FIG. 2.

Next, with reference to FIG. 5, an explanation will be given on a stepped speed change function by the ECT 400. FIG. 5 is an operational nomogram illustrating another operating state of the hybrid drive apparatus 10. Incidentally, in FIG. 5, the overlap points with FIG. 4 will carry the same reference numerals, and the explanation thereof will be omitted as occasion demands.

In FIG. 5, the left side shows an operational nomogram associated with the operations of the power dividing mechanism 300 illustrated in FIG. 2, and the right side shows an operational nomogram associated with the operations of the ECT 400.

In FIG. 5, it is assumed that the operating state of the power dividing mechanism 300 is expressed by one operational collinear line L_PG1 corresponding to the MG1 rotational speed Ng=0 and the MG2 rotational speed Nm=Nm1. According to the speed change action of the ECT 400, as different collinear lines as the number of gear stages can be drawn for one operating state of the power dividing mechanism 300.

For example, if the 1st-speed stage is selected as the gear stage, since the sun gear Sg2 and the ring gear Rg0 are fixed by the action of the clutch CL1, the rotational speed of the sun gear Sg2 is equal to the MG2 rotational speed Nm, as shown in a dashed line in FIG. 5. On the other hand, in the 1st-speed stage, the rotational speed of the carrier Cr1 is fixed to zero rotation by the action of the one-way clutch F1. Therefore, the operational collinear line in the 1st-speed stage is L_ECT1 in FIG. 5. As described above, the transmission gear ratio γ1 of the 1st-speed stage is greater than 1, so that the output shaft rotational speed Nout is less than the input shaft rotational speed Nin in the situation that the 1st-speed stage is selected.

Moreover, if the 2nd-speed stage is selected as the gear stage, since the sun gear Sg2 and the ring gear Rg0 are fixed by the action of the clutch CL1, the rotational speed of the sun gear Sg2 is equal to the MG2 rotational speed Nm, as shown in the dashed line in FIG. 5. On the other hand, in the 2nd-speed stage, the rotational speed of the sun gear Sg1 is fixed to the zero rotation by the action of the brake BR1. Therefore, the operational collinear line in the 2nd-speed stage is L_ECT2 in FIG. 5. As described above, the transmission gear ratio γ2 of the 2nd-speed stage is greater than 1 and less than γ1, so that the output shaft rotational speed Nout is less than the input shaft rotational speed Nin and greater than the rotational speed when the 1st-speed stage is selected in the situation that the 2nd-speed stage is selected.

Moreover, if the 3rd-speed stage is selected as the gear stage, since the sun gear Sg2 and the ring gear Rg0 are fixed by the action of the clutch CL1, the rotational speed of the sun gear Sg2 is equal to the MG2 rotational speed Nm, as shown in the dashed line in FIG. 5. On the other hand, in the 3rd-speed stage, the carrier Cr1 (i.e. the ring gear Rg2) is also fixed to the ring gear Rg0 by the action of the clutch CL2. Therefore, the operational collinear line in the 2nd-speed stage is L_ECT3 in FIG. 5. In other words, the input shaft rotational speed Nin is equal to the output shaft rotational speed Nout, and the 3rd-speed stage with a transmission gear ratio of 3 is established as described above.

Moreover, if the 4th-speed stage is selected as the gear stage, since the carrier Cr1 (i.e. the ring gear Rg2) and the ring gear Rg0 are fixed by the action of the clutch CL2, the rotational speed of the ring gear Rg2 is equal to the MG2 rotational speed Nm. On the other hand, in the 4th-speed stage, the rotational speed of the sun gear Sg1 is fixed to the zero rotation by the action of the brake BR1. Therefore, the operational collinear line in the 4th-speed stage is L_ECT4 in FIG. 5. As described above, the transmission gear ratio γ4 of the 4th-speed stage is less than 1, so that the output shaft rotational speed Nout is greater than the input shaft rotational speed Nin and a so-called overdrive state is realized in the situation that the 4th-speed stage is selected.

The electrical transmission efficiency ηe of the power dividing mechanism 300 is maximal when the MG1 rotational speed Ng=0. Therefore, ideally, the power dividing mechanism 300 is desirably driven in the state that Ng=0. Here, according to the action of the ECT 400, as described above, the output shaft rotational speed Nout can be changed into four stages with respect to one operating state of the power dividing mechanism 300. Therefore, according to the ECT 400, it is possible to increase the opportunity to operate the engine 200 at the operating point that the electrical transmission efficiency ηe can be maximal, and it is possible to maintain a good system transmission efficiency ηsys as the entire hybrid drive apparatus 10. Incidentally, on a practical operation side, the system transmission efficiency ηsys is the product of the electrical transmission efficiency ηe and a mechanical transmission efficiency ηt, and in the configuration that a plurality of engaging apparatuses are provided as in the ECT 400, a reduction in mechanical transmission efficiency resulting from those engaging apparatuses prevents an improvement in system transmission efficiency due to an increase in electrical transmission efficiency. Therefore, the effect by the ECT 400 is remarkably provided in the hybrid drive apparatus provided a relatively large-capacity engine as a power source.

<Details of Speed Change Control>

Figure 6:
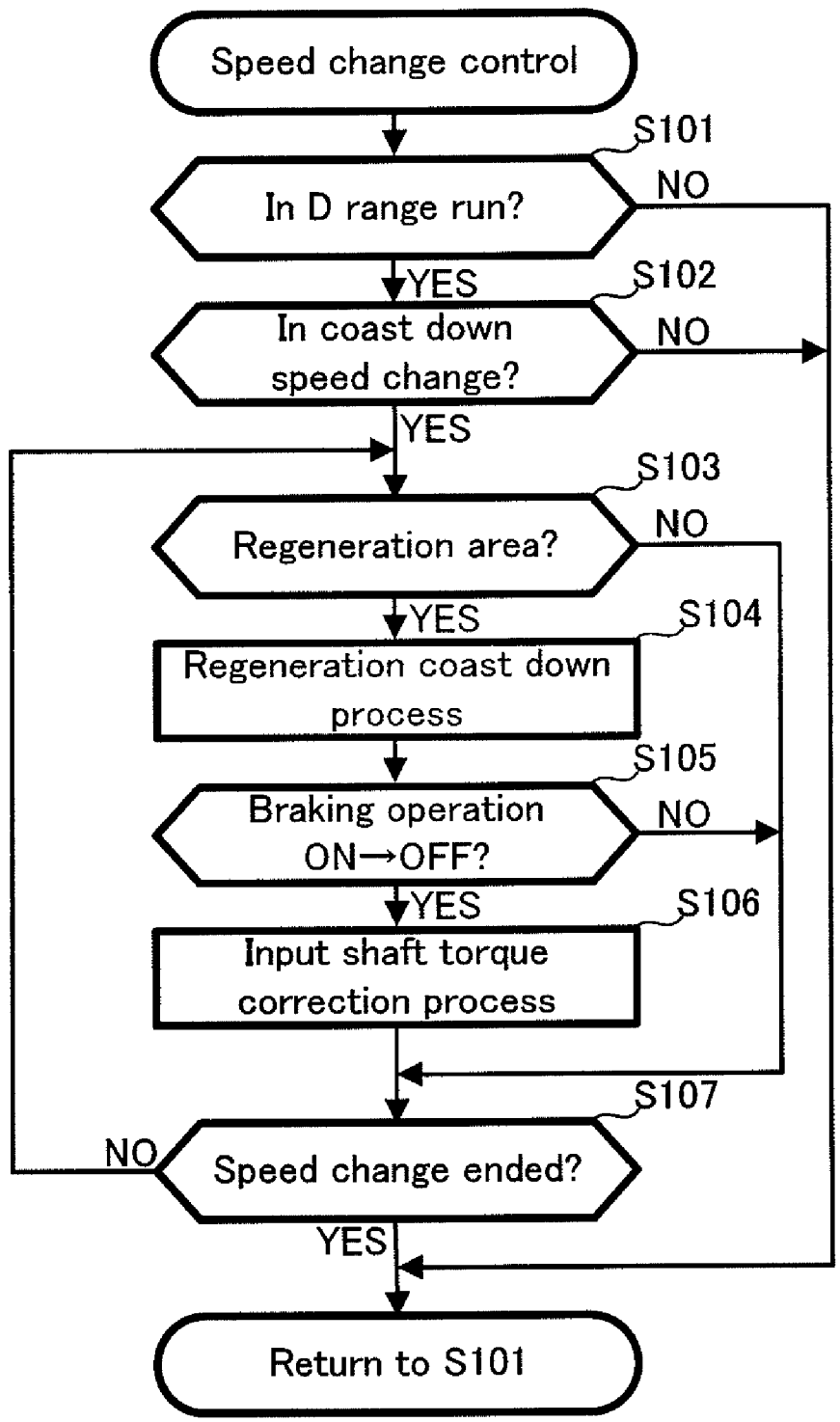
FIG. 6 is a flowchart showing speed change control performed by an ECU in the hybrid vehicle in FIG. 1.

Next, with reference to FIG. 6, an explanation will be given on the details of speed change control performed by the ECU 100. FIG. 6 is a flowchart showing the speed change control.

In FIG. 6, the ECU 100 judges whether or not the D range is selected by the driver as the shift position for defining the operation mode of the ECT 400, on the basis of a detection signal from the shift position sensor 16 (step S101). If the shift position other than the D range is selected (the step S101: NO), the ECU 100 repeatedly performs the step S101, and it is substantially in a standby state.

If the shift position is the D range (the step S101: YES), the ECU 100 judges whether or not the hybrid vehicle 1 is in the coast down speed change (step S102). Here, the "coast down speed change" means a speed change when the hybrid vehicle 1 is in a deceleration state. Incidentally, in this case, the coast down may be accompanied by aggressive braking performed by stepping on a brake pedal, or it may occur through inertia by the driver stopping the operation of an accelerator pedal.

Figure 7:
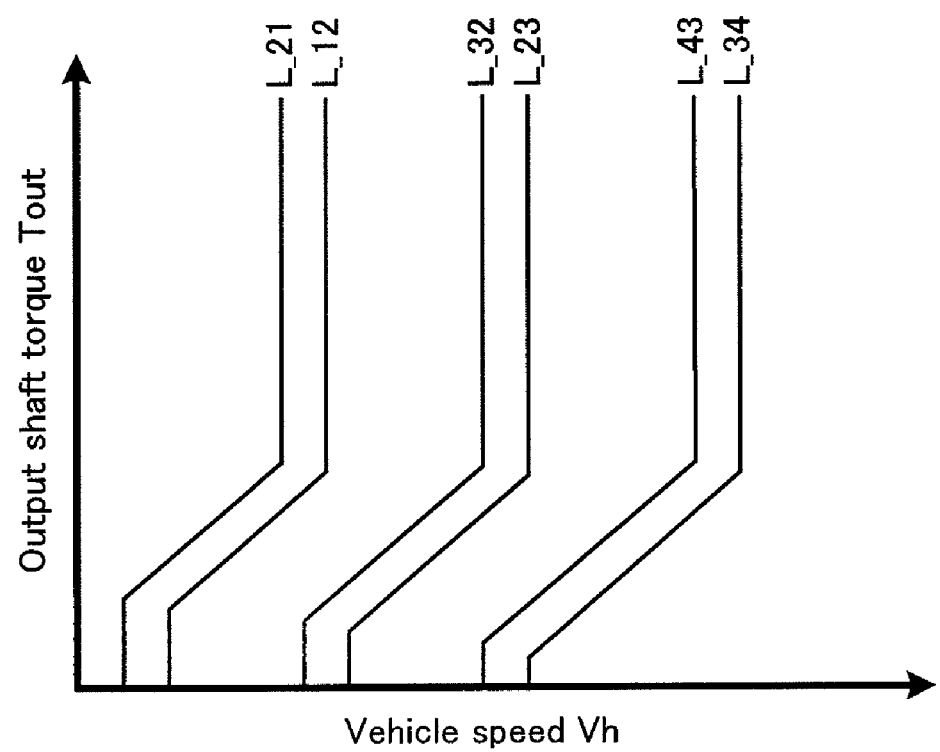
FIG. 7 is a schematic diagram showing a speed change map for defining the speed change condition of the transmission.

Now, with reference to FIG. 7, the speed change condition of the ECT 400 will be explained. FIG. 7 is a schematic diagram showing a speed change map for defining the speed change condition of the ECT 400.

In FIG. 7, the vertical axis and the horizontal axis show the output shaft torque Tout and the vehicle speed Vh, respectively. In the map, the speed change condition of the ECT 400 is defined by a speed change line 21 down speed change line L_21, a 12 up speed change line L_12, a 32 down speed change line L_32, a 23 up speed change line L_23, a 43 down speed change line L_43 and a 34 up speed change line L_34 in FIG. 7. More specifically, when the operational condition of the hybrid vehicle 1 at that time point crosses any speed change line, the speed change defined by each speed change line is realized. For example, if the operational condition of the hybrid vehicle 1 crosses the 32 down speed change line from an operation area on the right side of the 32 down speed change line, the ECU 100 controls the ECT 400 to perform a speed change from the 3rd-speed stage to the 2nd-speed stage (shift down). Alternatively, for example, if the operational condition of the hybrid vehicle 1 crosses the 12 up speed change line from an operation area on the left side of the 12 up speed change line, the ECU 100 controls the ECT 400 to perform a speed change from the 1st-speed stage to the 2nd-speed stage (shift up). The ROM of the ECU 100 stores therein a map for numerically defining the speed change map illustrated in FIG. 7 in advance.

Back in FIG. 6, if the hybrid vehicle 1 is not during the coast down speed change (the step S102: NO), the ECU 100 returns the process to the step S101. On the other hand, if the hybrid vehicle 1 is in the coast down speed change (the step S102: YES), the ECU 100 judges whether or not the operation area of the hybrid vehicle 1 corresponds to a regeneration area (step S103).

Here, the "regeneration area" is an area in which it is determined to output the regenerative torque from the motor generator MG2 (i.e. to input a torque from the input shaft 600 and the drive shaft 500) and to maintain the motor generator MG2 in an electricity generation state. The ROM of the ECU 100 stores therein a regeneration area map for defining the regeneration area, and the ECU 100 judges whether or not the operational condition of the hybrid vehicle 1 at that time point (e.g. a charge limit value Win or the like defined by the SOC (State Of Charge) of the battery 12 or the vehicle speed Vh) corresponds to the regeneration area, on the basis of the regeneration area map.

Incidentally, if the electric power regeneration by the MG2 is performed, the ECU 100 controls the PCU 11 to output a predetermined regenerative torque from the MG2 and supplies an generated electric power to the battery 12 via the PCU 11. At this time, the target value of the regenerative torque to be outputted from the MG2 is defined in a regenerative torque map stored in the ROM set in advance. Moreover, the target value of the regenerative torque is determined to change to be large or small with respect to the large or small brake pedal stepping amount Tb. On the other hand, the magnitude of the regenerative torque in the coast down run corresponds to the magnitude of the deceleration of the hybrid vehicle 1. In other words, the regenerative torque acts on the hybrid vehicle 1 as a type of braking force.

If the operational condition of the hybrid vehicle 1 does not correspond to the regeneration area (the step S103: NO), the ECU 100 transfers the process to a step S107. The step S107 will be described later. On the other hand, if the operational condition corresponds to the regeneration area (the step S103: YES), the ECU 100 starts a regeneration coast down process (step S104). The regeneration coast down process will be described later.

When starting the regeneration coast down process, the ECU 100 judges whether or not the brake pedal stepping amount Tb obtained via the brake pedal sensor 15 is changed from a value in a brake-on area in which the hybrid vehicle 1 requires the braking force to a value in a brake-off area in which the aggressive braking force is not required. At this time, particularly in the first embodiment, the ECU 100 judges whether or not the driver releases the brake pedal (i.e.

whether or not Tb has changed to Tb=0) in the state that the driver steps on the brake pedal (step S105). The operation of the ECU 100 in the step S105 is one example of the operations of the "detecting device" of the present invention.

If the brake pedal stepping amount Tb is not changed from the brake-on area to the brake-off area (the step S105: NO), i.e. if the brake pedal is not stepped on in the first place, if the brake pedal stepping amount Tb is changed in the brake-on area, or if the brake pedal stepping amount Tb is maintained at the value in the brake-on area, then, the ECU 100 transfers the process to the step S107. In other words, in this case, only the regeneration coast down process is performed.

On the other hand, if the operation position of the brake pedal is changed from the ON area to the OFF area (which means that the step S105 branches to the "YES" side; namely, one example of the "cases where the braking operation amount changes in a reducing direction which promotes a reduction in a braking force" in the present invention), the ECU 100 performs an input shaft torque correction process (step S106). The input shaft torque correction process will be described later. If the input shaft torque correction process is performed, the process is transferred to the step S107.

In the step S107, it is judged whether or not the speed change is ended (step S107). If the speed change is continuing (the step S107: NO), the ECU 100 returns the process to the step S103 and repeats or continues a series of operation processes. If the speed change is ended (the step S107: NO), the ECU 100 returns the process to the step S101 and repeats the series of operation processes. Incidentally, whether or not the speed change is ended is judged on the basis of whether or not the input shaft rotational speed Nin converges to a synchronous rotational speed corresponding to the gear stage after the end of the speed change.

The speed change control in the first embodiment is performed as described above. Incidentally, if the steps S101 and S102 branch to the "NO" side, that does not mean that the ECT 400 is not controlled. In other words, the speed change control illustrated in FIG. 6 is the speed change control at the time of coast down speed change. The control aspects of the ECT 400 in other cases are separately performed by the ECU 100 without delay, as normal speed change control.

<Effect of Speed Change Control>

Figure 8:
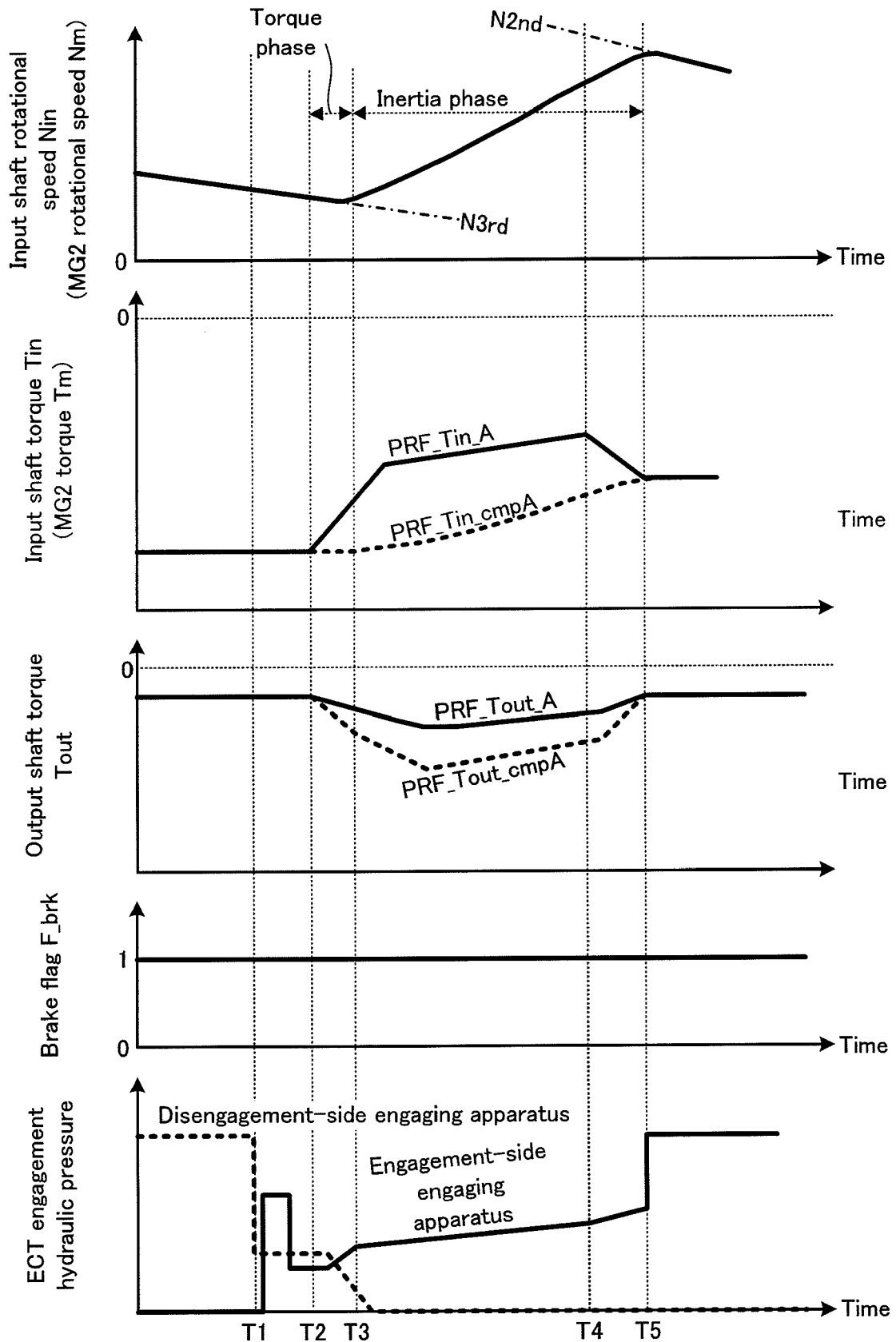
FIG. 8 is a timing chart illustrating one temporal transition of the states of respective parts of the ECT, which is associated with the effect of a regeneration coast down process in the speed change control in FIG. 6.

Now, with reference to FIG. 8, the effect of the speed change control will be explained. FIG. 8 is a timing chart illustrating one temporal transition of the states of respective parts of the ECT, which is associated with the effect of the regeneration coast down process in the speed change control. Incidentally, FIG. 8 shows cases where the coast down speed change is performed from the 3rd-speed stage to the 2nd-speed stage.

In FIG. 8, the vertical axis shows the input shaft rotational speed Nin, the input shaft torque Tin, the output shaft torque Tout, a brake flag F_brk and the engagement hydraulic pressure of each engaging apparatus in the ECT 400 in order from the top, and the horizontal axis integrally shows time. Incidentally, the brake flag F_brk is a flag which is set to "1" if the brake pedal is operated, which is set to "0" if the brake pedal is not operated, and which is set by the ECU 100 on the basis of the sensor output of the shift position sensor 15. In other words, cases where the step S105 in FIG. 6 branches to the "ON" side mean cases where the brake pedal F_brk changes from "1" to "0".

In FIG. 8, it is assumed that the speed change condition associated with the coast down speed change is satisfied at a time point T1. In this case, the ECU 100 reduces the engagement hydraulic pressure of the engaging apparatus on the disengagement side (clutch CL2) as shown in a dashed line in FIG. 8 and increases the engagement hydraulic pressure of the engaging apparatus on the engagement side (brake BR1) as shown in a solid line in FIG. 8, at the time point T1. At a tie point T5 at which the speed change is ended, the engagement hydraulic pressure of the brake BR1 on the engagement side reaches to a predetermined value for maintaining the engagement state.

Then, at a time point T2 in FIG. 8, a torque phase is started. The torque phase means a torque transfer period for increasing the input shaft rotational speed Nin (i.e. the MG2 rotational speed Nm) to a 2nd-speed synchronous rotational speed N2nd (refer to an alternate long and short dash line in FIG. 8) by increasing the engagement hydraulic pressure of the engaging apparatus on the engagement side (here, the brake BR1). Moreover, at a time point T3, an inertia phase starts in which the input shaft rotational speed Nin actually starts to be increased by the engagement torque of the engaging apparatus. At a time point T4 at which the input shaft rotational speed Nin reaches to a predetermined ratio with respect to the 2nd-speed synchronous rotational speed, the ECU 100 judges the end of the speed change, and the inertia phase ends at a time point T5 after the time point T4. Incidentally, in the first embodiment, the end of the inertia phase is treated equally to the end of the speed change period.

The speed change of the ECT 400 is a so-called equal power speed change, and it is performed to maintain the vehicle speed Vh at that time point (i.e. a request output requested of the hybrid drive apparatus 10) before and after the speed change. Therefore, in performing the speed change, it is necessary to increase (in case of downshifting) the input shaft rotational speed Nin to the synchronous rotational speed corresponding to the gear stage selected after the speed change. On the other hand, the output shaft torque Tout is maintained at an original value as the output shaft rotational speed Nout is maintained.

Here, if the regeneration coast down process is not performed, the input shaft torque Tin increases (incidentally, which approaches zero as an actual response because the output torque of the MG2 is the regenerative torque which is a negative torque in the regeneration coast down speed change) with the increase of the input shaft rotational speed Nin to the 2nd-speed synchronous rotational speed. The characteristic is shown as PRF_Tin_cmpA (dashed line) in FIG. 8.

However, with respect to the temporal transition of the input shaft torque Tin, the actual output shaft torque Tout temporarily decreases (refer to PRF_Tout_cmpA (dashed line)) as one portion thereof is consumed by a change in rotational speed of the MG2 in the torque phase and the inertia phase. As a result, a torque shock occurs in the speed change, which is a factor to reduce drivability.

Thus, in the regeneration coast down process, the regenerative torque of the MG2 equivalent to the input shaft torque Tin (incidentally, a large or small change in magnitude of the regenerative torque corresponds to a small or large change in magnitude of the input shaft torque Tin, respectively) decreases more in comparison with a comparative example (PRF_Tin_A (solid line) in FIG. 8). As a result, the actual response of the output shaft torque Tout is as shown in PRF_Tout_A (solid line) in FIG. 8, and the reduction in the output shaft torque Tout is suppressed by the amount of the reduced regenerative torque. Thus, the torque shock can be mitigated.

Figure 9:
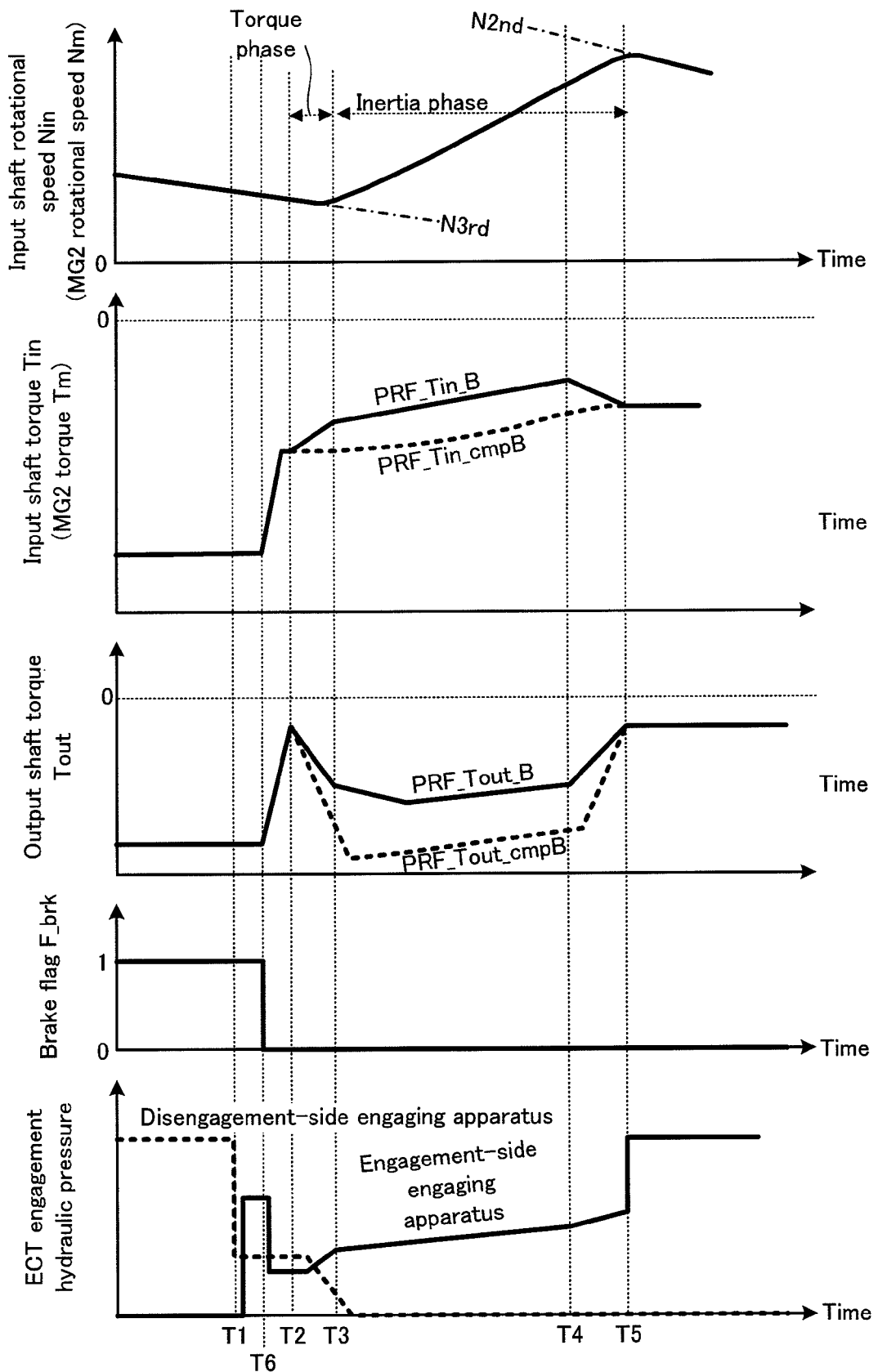
FIG. 9 is a timing chart illustrating one temporal transition of the states of respective parts of the ECT in cases where an input shaft torque correction process is not performed in the speed change control in FIG. 6.

Next, with reference to FIG. 9, an explanation will be given on the necessity of the input shaft torque correction process. FIG. 9 is a timing chart illustrating one temporal transition of the states of respective parts of the ECT in cases where the input shaft torque correction process is not performed. Incidentally, in FIG. 9, the overlap points with FIG. 8 will carry the same reference numerals, and the explanation thereof will be omitted as occasion demands.

In FIG. 9, it is assumed that the operation of the brake pedal is stopped at a time point T6 before the start of the torque phase.

If the operation of the brake pedal is stopped, the input shaft torque Tin significantly changes at that time point as the scale of the electric power regeneration by the MG2 is reduced. That does not change whether the regeneration coast down process is performed (PRF_Tin_B (solid line)) or not performed (PRF_Tin_cmpB (dashed line)).

On the other hand, the target value of the output shaft torque Tout is changed before and after the speed change due to the change in brake pedal stepping amount Tb. If there is such a temporal variation of the input shaft torque Tin, the output shaft torque Tout temporarily increases. However, after that, if there is the change in output shaft torque Tout by the torque phase and the inertia phase described above, then, the variation of the output shaft torque Tout becomes large because it is after the temporal increase. Thus, whether the regeneration coast down process is performed (PRF_Tout_B (solid line)) or not performed (PRF_Tout_cmpB (dashed line)), the variation of the output shaft torque likely reduces the drivability. In other words, in the regeneration coast down, it is necessary to compensate for the brake-off operation of the brake pedal. The compensation is, namely, the input shaft torque correction process.

Figure 10:
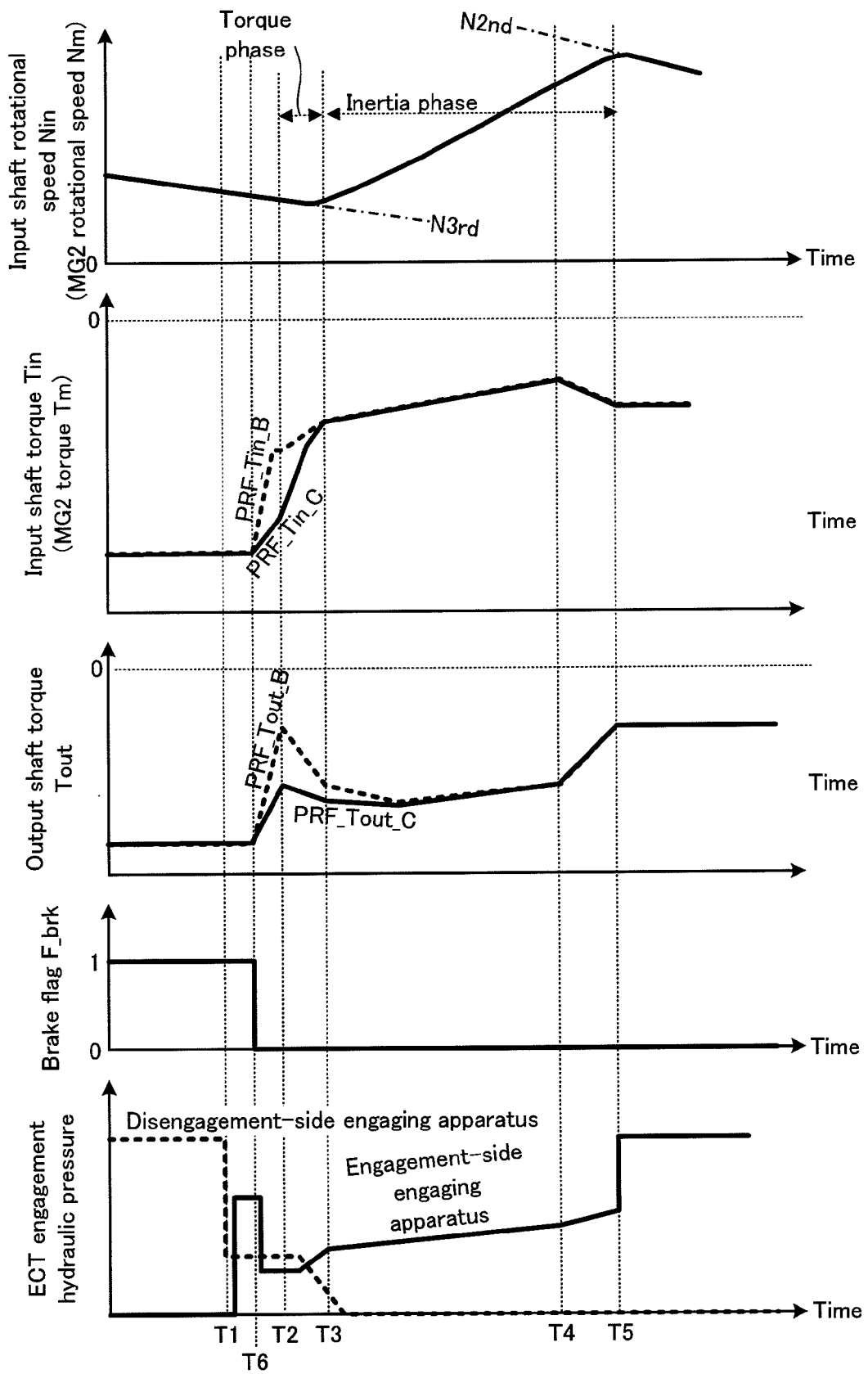
FIG. 10 is a timing chart illustrating one temporal transition of the states of respective parts of the ECT in cases where one example of the input shaft torque correction process is performed in the speed change control in FIG. 6.

Next, with reference to FIG. 10, the effect of the input shaft torque correction process will be explained. FIG. 10 is a timing chart illustrating one temporal transition of the states of respective parts of the ECT in cases where one example of the input shaft torque correction process is performed. Incidentally, in FIG. 10, the overlap points with FIG. 9 will carry the same reference numerals, and the explanation thereof will be omitted as occasion demands.

In FIG. 10, the ECU 100 limits the increasing speed of the input shaft torque Tin as one aspect of the input shaft torque correction process. The input shaft torque Tin sharply rises simultaneously with the off operation of the brake pedal if no measures are taken. The ECU 100 places an upper limit on the increasing speed of the input shaft torque Tin and suppresses the sharp rise in the input shaft torque.

The temporal transition of the input shaft torque Tin in that case is shown as PRF_Tin_C (solid line) in FIG. 10. As illustrated, in comparison with the characteristic in cases where no measures are taken (i.e. PRF_Tin_B (dashed line)), the rise characteristic of the input shaft torque Tin becomes slow by the input shaft torque correction process.

As a result, the scale of the temporal increase in the output shaft torque Tout by the brake-off operation is reduced (PRF_Tout_C (solid line)), and the shock can be reduced in comparison with cases where the input shaft torque correction process is not performed (PRF_Tout_B (dashed line)).

Incidentally, there may be various practical aspects in limiting the increasing speed of the input shaft torque. For example, the characteristic may be realized as shown in FIG. 10 by gradually changing the upper limit value of the input shaft torque Tin with respect to a change in time, or time filtering may be performed by a time filtering process or the like. Alternatively, the target value of the regenerative torque may be limited in accordance with numeric operation based on a correction coefficient.

Figure 11:
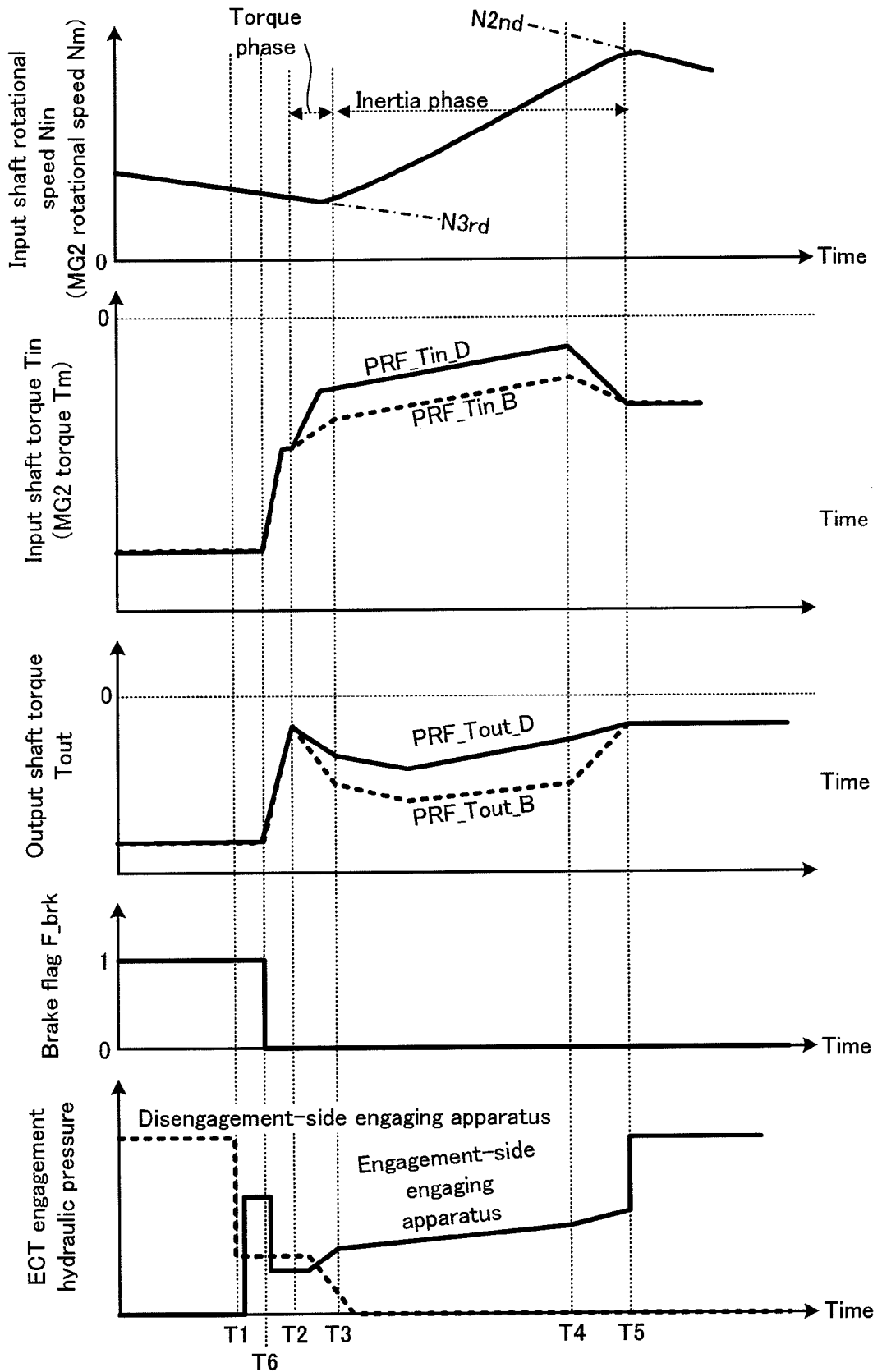
FIG. 11 is a timing chart illustrating one temporal transition of the states of respective parts of the ECT in cases where another example of the input shaft torque correction process is performed in the speed change control in FIG. 6.

Next, with reference to FIG. 11, another effect of the input shaft torque correction process will be explained. FIG. 11 is a timing chart illustrating one temporal transition of the states of respective parts of the ECT in cases where another example of the input shaft torque correction process is performed. Incidentally, in FIG. 11, the overlap points with FIG. 9 will carry the same reference numerals, and the explanation thereof will be omitted as occasion demands.

In FIG. 11, the ECU 100 further reduces the amount of reduction in the regenerative torque of the MG2 as one aspect of the input shaft torque correction process. In other words, the ECU 100 corrects the amount of reduction in the regenerative torque in the regeneration coast down process, to the further reduction side. The temporal transition of the input shaft torque Tin in cases where such a process is performed is shown as PRF_Tin_D (solid line) in FIG. 11. If the input shaft torque correction process is performed in this manner, the regenerative torque of the MG2 is further reduced in comparison with cases where only the regeneration coast down process is performed (PRF_Tin_B (dashed line)).

If the regenerative torque is corrected to the further reduction side as described above, the drop in the output shaft torque Tout in the torque phase and the inertia phase is mitigated (PRF_Tout_D (solid line)). Therefore, in comparison with cases where only the regeneration coast down process is performed (PRF_Tout_B (dashed line)), the drop in the output shaft torque Tout which has temporarily increased by the brake-off operation is suppressed. In other words, the deterioration in drivability is mitigated.

Incidentally, as for the amount of reduction in the regenerative torque in the regeneration coast down process, the variation of the output shaft torque by the brake-off operation of this type is not assumed. In other words, the reduction in the regenerative torque as the input shaft torque correction process and the reduction in the regenerative torque in the regeneration coast down process are equal with respect to the technical matters about the reduction in the regenerative torque but are totally different in the essential part.

Figure 12:
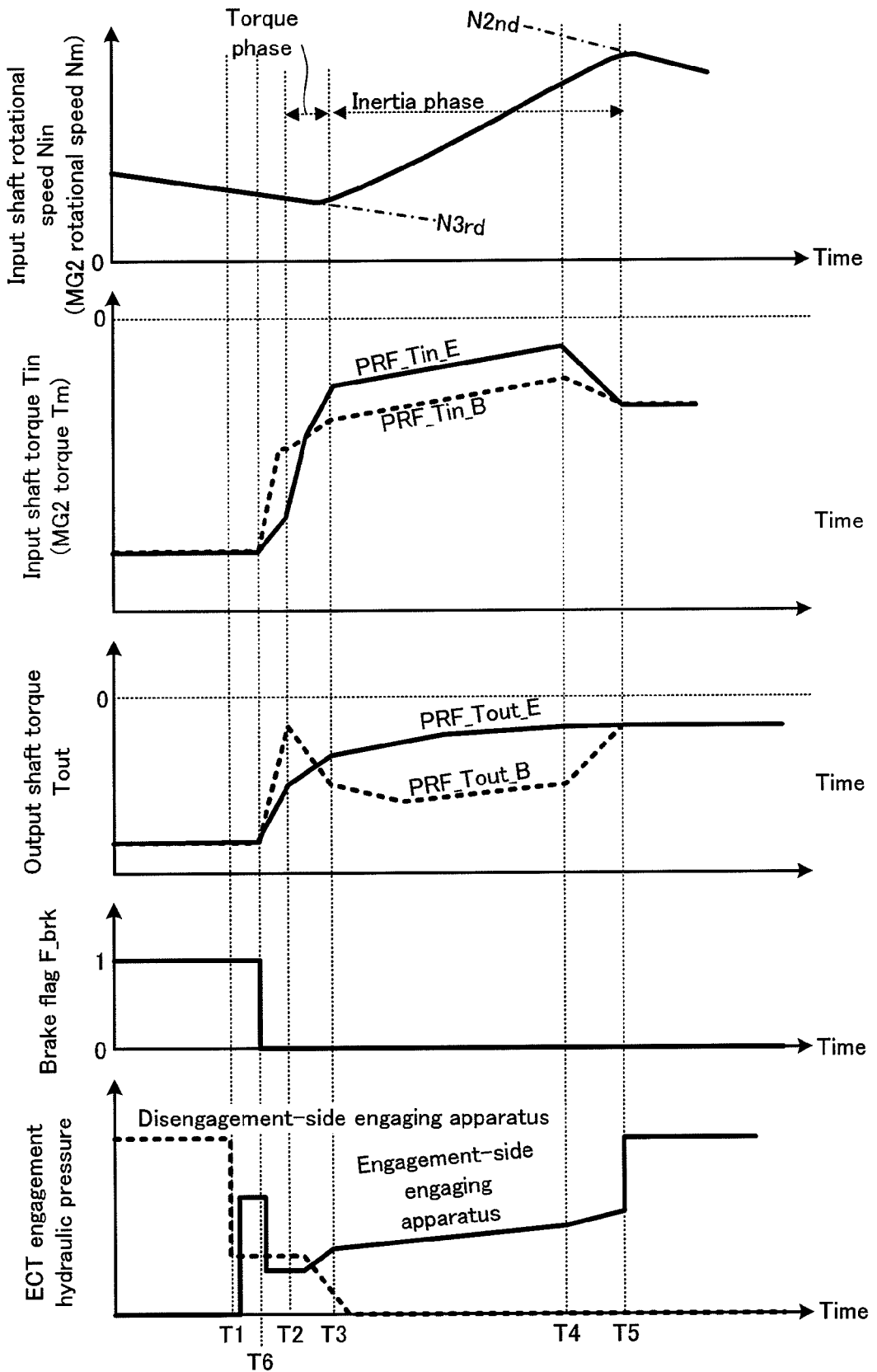
FIG. 12 is a timing chart illustrating one temporal transition of the states of respective parts of the ECT in cases where another example of the input shaft torque correction process is performed in the speed change control in FIG. 6.

Next, with reference to FIG. 12, another effect of the input shaft torque correction process will be explained. FIG. 12 is a timing chart illustrating one temporal transition of the states of respective parts of the ECT in cases where another example of the input shaft torque correction process is performed. Incidentally, in FIG. 12, the overlap points with FIG. 9 will carry the same reference numerals, and the explanation thereof will be omitted as occasion demands.

In FIG. 12, the ECU 100 performs the limitation of the increasing speed of the input shaft torque illustrated in FIG. 10 and the correction of reduction in the regenerative torque of the MG2 illustrated in FIG. 11, in synchronization with each other, as one aspect of the input shaft torque correction process.

The temporal transition of the input shaft torque Tin in cases where such a process is performed is shown as PRF_Tin_E (solid line) in FIG. 12. If the input shaft torque correction process is performed in this manner, the increasing speed associated with the increase in the input shaft torque accompanied with the brake-off operation is limited in comparison with cases where only the regeneration coast down process is performed (PRF_Tin_B (dashed line)), causing its gentle rise. At the same time, the regenerative torque of the MG2 is corrected and further reduced with respect to the amount of reduction in the regeneration coast down.

If the increasing speed is limited and the regenerative torque is corrected to be reduced as described above, the rise of the output shaft torque Tout is filtered, and the drop in the output shaft torque Tout in the torque phase and the inertia phase is mitigated (PRF_Tout_E (solid line)). Therefore, the temporal transition of the output shaft torque Tout becomes extremely smooth, and the drivability is remarkably improved in comparison with cases where only the regeneration coast down process is performed (PRF_Tout_B (dashed line)).

As described above, according to the first embodiment, if the brake-off operation is performed in the regeneration coast down, the input shaft torque correction process is performed by the ECU 100, and the variation of the output shaft torque Tout is preferably suppressed. Therefore, it is possible to preferably maintain the drivability in the regeneration coast down without an influence of the braking operation.

Figure 13:
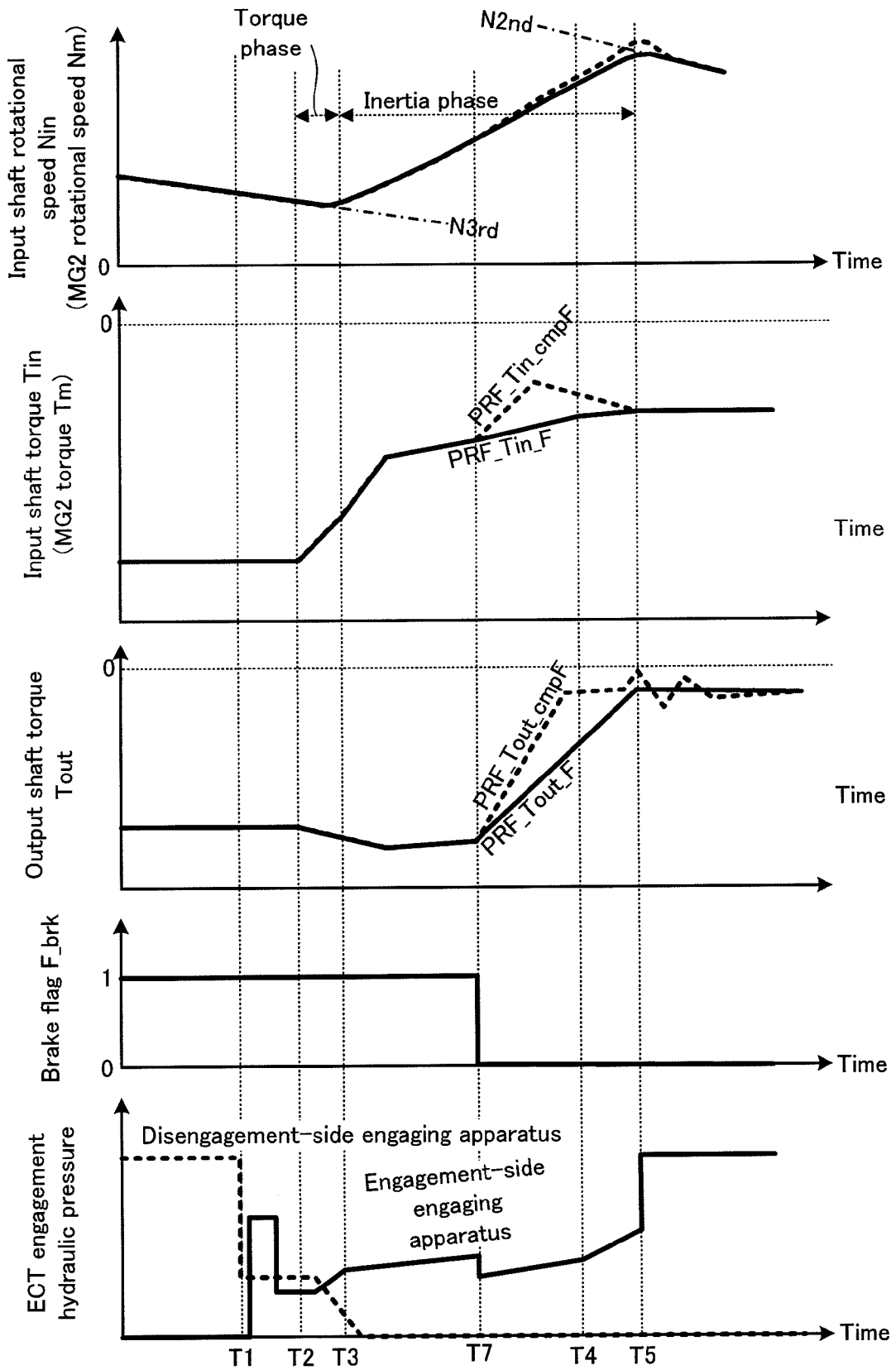
FIG. 13 is a timing chart illustrating one temporal transition of the states of respective parts of the ECT in cases where another example of the input shaft torque correction process is performed in the speed change control in FIG. 6.

Incidentally, in FIG. 10 to FIG. 12, the brake-off operation is performed before the start of the torque phase. For the brake-off operation which is performed in timing before the start of the torque phase as described above, the correction of the input torque in the first embodiment is remarkably effective. Of course, the correction of the input shaft torque is also effective for the suppression of the variation of the output shaft torque even if the brake-off operation is performed in other timing. This will be explained with reference to FIG. 13. FIG. 13 is a timing chart illustrating one temporal transition of the states of respective parts of the ECT in cases where another example of the input shaft torque correction process is performed. Incidentally, in FIG. 13, the overlap points with FIG. 9 will carry the same reference numerals, and the explanation thereof will be omitted as occasion demands.

In FIG. 13, as opposed to the earlier examples, it is assumed that the brake-off operation is performed at a time point T7 corresponding to the inertia phase. In this case, if no measures are taken, the input shaft torque Tin increases (the regenerative torque decreases) at the time point T7 as in PRF_Tin_cmpF (dashed line) in FIG. 13. At this time, the engagement hydraulic pressure of the engagement-side engaging apparatus is corrected to the reduction side (solid line), but the relevant process can hardly stop a sudden change in the input shaft rotational speed Nin due to an actual response delay in the engagement hydraulic pressure. As a result, the output shaft torque Tout varies before and after the end of the speed change as in PRF_Tout_cmpF (dashed line) in FIG. 13, causing the deterioration in drivability.

In contrast, if the input shaft torque correction process is performed, the sudden change in the input shaft torque Tin in the timing of the brake-off operation is suppressed (PRF_Tin_F (solid line) in FIG. 13). Thus, with the effect of the reduction in hydraulic pressure of the engaging apparatus, the sudden change in the input shaft rotational speed Nin in the end of the speed change can be suppressed. Therefore, the input shaft rotational speed Nin reaches to the 2nd-speed rotational speed without overshoot (dashed line).

Moreover, the variation of the output shaft torque Tout is suppressed due to the effect of the suppression of the increasing speed of the input shaft torque Tin (PRF_Tout_F (solid line) in FIG. 13). As described above, the input shaft torque correction process in the first embodiment clearly produces the effect of the suppression of the variation of the output shaft torque Tout even if the brake-off operation is performed in any timing in the regeneration coast down.

Incidentally, in FIG. 13, the suppression of the increasing speed of the input shaft torque is adopted as the input shaft torque correction process; however, it is obvious that the aspect illustrated in FIG. 11 or FIG. 12 can be easily applied.

Incidentally, in the first embodiment, the aspect of controlling the electric power regeneration by the MG2 remains unchanged. However, for example, if the SOC of the battery 12 (in this case, the SOC means a standardized index value for defining the state of charge) is greater than or equal to a predetermined value, the necessity of the electric power regeneration decreases. Thus, even if the brake-off operation is performed in the regeneration coast down, the variation of the output shaft torque becomes relatively small. On the other hand, if the SOC of the battery 12 is less than a predetermined value (which is different from the aforementioned predetermined value), the necessity of the electric power regeneration increases. Thus, the variation of the output shaft torque becomes relatively large in cases where the brake-off operation is performed in the regeneration coast down.

In view of this regard, for example, the ECU 100 may use the sensor output of an SOC sensor or the like attached to the battery 12 and determine the scale or correction aspect of the input shaft torque associated with the input shaft torque correction process in accordance with the state of change of the battery 12 at that time point. Moreover, such an index value is not limited to the SOC but may be, for example, the temperature of the battery 12. In the battery 12, its discharge and charge performance decrease in a low-temperature or high-temperature area. Therefore, in the low-temperature or high-temperature area, such a measure may be taken that the scale of correction in the input shaft torque correction process is relatively increased.

Second Embodiment

Figure 14:
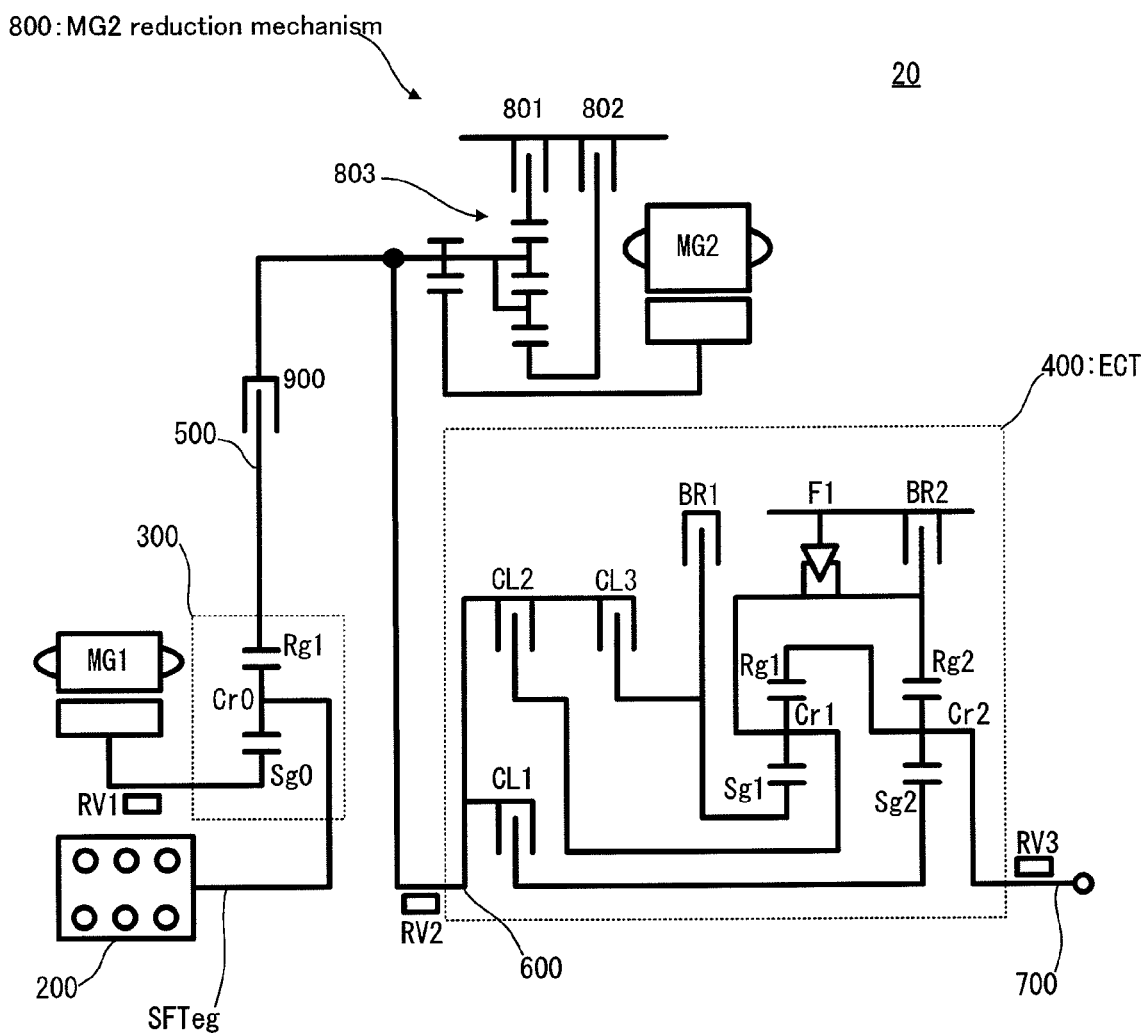
FIG. 14 is a schematic configuration diagram conceptually showing the structure of another hybrid drive apparatus in a second embodiment of the present invention.

The structure of the hybrid drive apparatus is not limited to that of the hybrid drive apparatus 10 in the first embodiment. Now, with reference to FIG. 14, an explanation will be given on the structure of a hybrid drive apparatus 20 in a second embodiment of the present invention. FIG. 14 is a schematic configuration diagram conceptually showing the structure of the hybrid drive apparatus 20. Incidentally, in FIG. 14, the overlap points with FIG. 2 will carry the same reference numerals, and the explanation thereof will be omitted as occasion demands.

In FIG. 14, the hybrid drive apparatus 20 is constructed such that the drive shaft 500 and the input shaft 600 are selectively controlled into the engagement or disengagement state by a clutch 900. Moreover, between the motor generator MG2 and the input shaft 600, there is disposed a MG2 reduction mechanism 800 capable of decelerating the MG2 rotational speed Nm at two stages.

The MG2 reduction mechanism 800 is provided with: brake mechanisms 801 and 802 as wet multi-plate engaging apparatuses; and a differential mechanism 803 including rotational elements each of which is coupled with the brake mechanisms. The MG2 reduction mechanism 800 has such a configuration that the reduction ratio of the MG2 rotational speed Nm differs between cases where the brake mechanism 801 is selected as the brake mechanism and cases where the brake mechanism 802 is selected. In addition to the speed change by the ECT 400, the MG2 reduction mechanism 800 can operate the MG2 in a more efficient operation area at that time point. Even in this configuration, of course, the aforementioned speed change control can be applied.

Moreover, in the state that the clutch 900 is controlled to the disengagement side, the power source of the hybrid drive apparatus 20 is only the MG2. This state is equal to a so-called electric vehicle. In other words, the vehicle within the scope of the present invention is not limited to the hybrid vehicle but also includes the electric vehicle in which only the motor is used as the power source.

Third Embodiment

Figure 15:
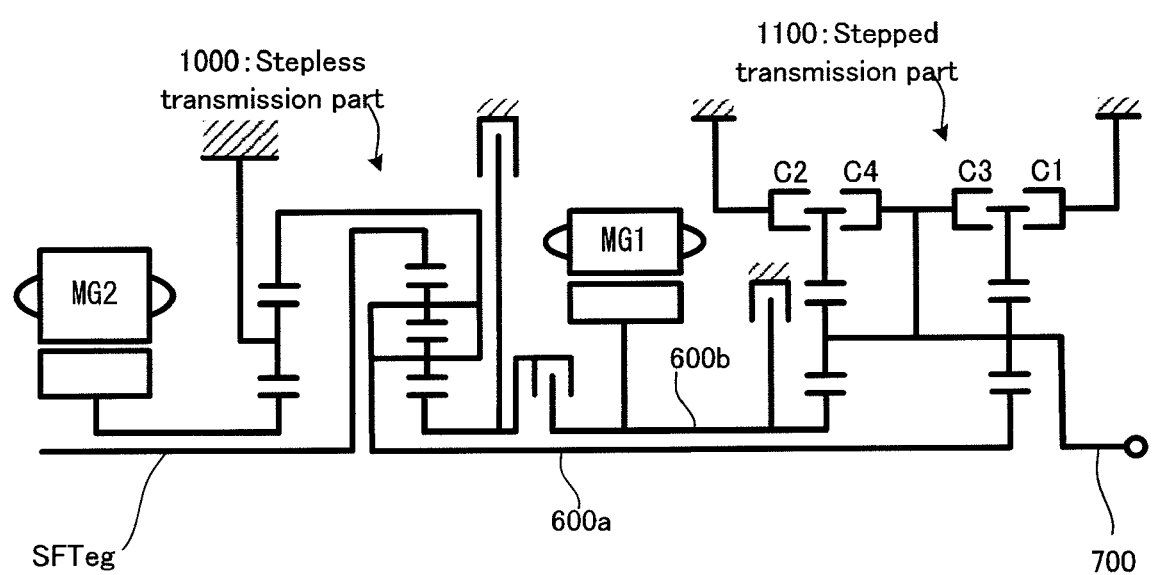
FIG. 15 is a schematic configuration diagram conceptually showing the structure of another hybrid drive apparatus in a third embodiment of the present invention.

The structure of the hybrid drive apparatus is not limited to that of the hybrid drive apparatus 10 in the first embodiment. Now, with reference to FIG. 15, an explanation will be given on the structure of a hybrid drive apparatus 30 in a third embodiment of the present invention. FIG. 15 is a schematic configuration diagram conceptually showing the structure of the hybrid drive apparatus 30. Incidentally, in FIG. 15, the overlap points with FIG. 2 will carry the same reference numerals, and the explanation thereof will be omitted as occasion demands.

In FIG. 15, the hybrid drive apparatus 30 has a stepless transmission part 1000 and a stepped transmission part 1100. The stepless transmission part 1000 is provided with: a planetary gear unit, which is conceptually equal to the power dividing mechanism 300 in the hybrid drive apparatus 10; and a reduction gear for decelerating the MG2 rotational speed Nm, and it functions as a 2-degree-of-freedom differential mechanism as in the power dividing mechanism 300.

On the other hand, the stepped transmission part 1100 is provided with: clutches C1, C2, C3 and C4; and two pairs of differential mechanisms, and it realizes a plurality of gear stages in accordance with their engagement state.

Here, according to the hybrid drive apparatus 30, it is possible to change between a driving element and a reaction element due to the function of the stepped transmission part 1100. For example, if the clutch C1 is engaged and the clutch C2 is disengaged, the input shaft of the transmission is an input shaft 600*a* in FIG. 15, the MG2 is the driving element (an element for inputting or outputting a torque with respect to the output shaft 700) and the MG1 is the reaction element, as in the aforementioned embodiments. On the other hand, if the clutch C2 is engaged and the clutch C1 is disengaged, the input shaft of the transmission is an input shaft 600*b* in FIG. 15, the MG1 is the driving element (in this case, the MG1 functions as the "rotating electrical machine" of the present invention) and the MG2 is the reaction element, as opposed to the aforementioned embodiments. As described above, the present invention can be applied even to the hybrid vehicle which can run while the driving element and the reaction element can be selectively changed depending on the engagement state of the transmission parts.

The present invention is not limited to the aforementioned embodiments, but various changes may be made, if desired, without departing from the essence or spirit of the invention which can be read from the claims and the entire specification. A vehicle control apparatus, which involves such changes, is also intended to be within the technical scope of the present invention.

INDUSTRIAL APPLICABILITY

The present invention can be widely applied to a vehicle provided with a stepped transmission between an axle and a rotating electrical machine which can perform power running and regeneration.

DESCRIPTION OF REFERENCE CODES

1 hybrid vehicle
10 hybrid drive apparatus
100 ECU
200 engine
300 power dividing mechanism
400 transmission
500 drive shaft
600 input shaft
700 output shaft

The invention claimed is:

1. A vehicle control apparatus for controlling a vehicle, the vehicle comprising:

a rotating electrical machine capable of inputting or outputting a torque with respect to an input shaft; and
a transmission, which is disposed between the input shaft and an output shaft coupled with an axle, which is provided with a plurality of engaging apparatuses, which transmits a torque between the input shaft and the output shaft, and which can establish a plurality of gear stages having mutually different transmission gear ratios in accordance with engagement states of the plurality of engaging apparatuses, the transmission gear ratio being a ratio between a rotational speed of the input shaft and a rotational speed of the output shaft, said vehicle control apparatus comprising:
a detecting device for detecting a braking operation amount of a driver; and
an input shaft torque controlling device for controlling a torque of the input shaft such that in cases where the detected braking operation amount changes in a reducing direction which promotes a reduction in a braking force applied to the vehicle in a coast regeneration speed change period in which the gear stage is changed at the time of coast regeneration of the rotating electrical machine, a change in torque of the output shaft accompanied by the change in the braking operation amount is suppressed.

2. The vehicle control apparatus according to claim 1, wherein said input shaft torque controlling device controls the torque of the input shaft in cases where the braking operation amount changes from a value in which the braking force is to be applied to a value in which the braking force is not to be applied, as the cases where the detected braking operation amount changes in the reducing direction.

3. The vehicle control apparatus according to claim 1, wherein said input shaft torque controlling device controls the torque of the input shaft in cases where the detected braking operation amount changes in the reducing direction in a change period of changing the gear stage.

4. The vehicle control apparatus according to claim 3, wherein said input shaft torque controlling device controls the torque of the input shaft in cases where the detected braking operation amount changes in the reducing direction in a period from when a request to change the gear stages is made to when a torque phase which is one portion of the coast regeneration speed change period starts, as the change period.

5. The vehicle control apparatus according to claim 1, wherein said input shaft torque controlling device limits an increasing speed of the torque of the input shaft in comparison with cases where the detected braking operation amount changes in the reducing direction in a period other than the coast regeneration speed change period.

6. The vehicle control apparatus according to claim 1, further comprising a suppressing device for suppressing the change in torque of the output shaft by reducing a regenerative torque of the rotating electrical machine, in at least one of a torque phase and an inertia phase which constitute one portion of the coast regeneration speed change period, said input shaft torque controlling device correcting an amount of reduction in the regenerative torque associated with said suppressing device to a further reduction side.

7. The vehicle control apparatus according to claim 1, further comprising a suppressing device for suppressing the change in torque of the output shaft by reducing a regenerative torque of the rotating electrical machine, in at least one of a torque phase and an inertia phase which constitute one portion of the coast regeneration speed change period, said input shaft torque controlling device limiting an increasing speed of the torque of the input shaft in comparison with cases where the detected braking operation amount changes in the reducing direction in a period other than the coast regeneration speed change period, said input shaft torque controlling device correcting an amount of reduction in the regenerative torque associated with said suppressing device to a further reduction side.

8. The vehicle control apparatus according to claim 1, further comprising an engagement hydraulic pressure controlling device for changing an engagement hydraulic pressure of the engaging apparatus associated with the gear stage after speed change to be high or low, in accordance with a high or low change speed of the torque of the input shaft, respectively.

9. The vehicle control apparatus according to claim 1, wherein
the vehicle further comprises a storage battery device capable of inputting or outputting an electric power with respect to the rotating electrical machine,
said vehicle control apparatus further comprises a regenerative torque controlling device for controlling a regenerative torque of the rotating electrical machine at the time of the coast regeneration within limitations defined in accordance with at least one of amount of storage and temperature of the storage battery device, and
said input shaft torque controlling device controls the torque of the input shaft in accordance with a control state of the regenerative torque by said regenerative torque controlling device.

10. The vehicle control apparatus according to claim 1, wherein the vehicle comprises:
an internal combustion engine;
another rotating electrical machine which is different from the rotating electrical machine, as a reaction element for providing a reaction torque for the internal combustion engine; and
a differential mechanism, which is provided with a plurality of rotational elements including rotational elements each of which is coupled with respective one of the internal combustion engine, the rotating electrical machine and the other rotating electrical machine and which can change a ratio between a rotational speed of the internal combustion engine and a rotational speed of the rotating electrical machine in a stepless manner.

* * * * *